US011995581B2

(12) United States Patent
Casagrande et al.

(10) Patent No.: US 11,995,581 B2
(45) Date of Patent: May 28, 2024

(54) METHOD OF PROVIDING CLIENT SERVICE

(71) Applicant: VALET LIVING, LLC, Tampa, FL (US)

(72) Inventors: Rob Casagrande, East Greenwich, RI (US); Mike Jacobs, Summerfield, NC (US); Matt Graves, Nashville, TN (US); Marc Cramer, Homosassa, FL (US); Patti Girardi, Tampa, FL (US); Steve Davis, Plano, TX (US); Divya Tadi, St. Petersburg, FL (US); Jeremy Pfeifer, Lithia, FL (US); Jeremy S. McDonald, Kennesaw, GA (US); Brett Brown, Del Mar, CA (US); Patrick Shawn Handrahan, Pensacola Beach, FL (US); Igor Stanisavljev, Vienna, VA (US); Balaji Ramanujam, Fairfax, VA (US)

(73) Assignee: Valet Living, LLC, Tampa, FL (US)

( * ) Notice: Subject to any disclaimer, the term of this patent is extended or adjusted under 35 U.S.C. 154(b) by 0 days.

(21) Appl. No.: 18/128,811

(22) Filed: Mar. 30, 2023

(65) Prior Publication Data
US 2023/0325733 A1 Oct. 12, 2023

Related U.S. Application Data

(63) Continuation of application No. 16/704,128, filed on Dec. 5, 2019, now Pat. No. 11,625,653.

(60) Provisional application No. 62/825,837, filed on Mar. 29, 2019.

(51) Int. Cl.
*G06Q 10/0631* (2023.01)
*G06Q 10/087* (2023.01)
*G06Q 10/20* (2023.01)
*G06Q 10/30* (2023.01)
*G06Q 50/163* (2024.01)
*G07C 9/00* (2020.01)
*G07C 9/37* (2020.01)
(Continued)

(52) U.S. Cl.
CPC ..... *G06Q 10/06311* (2013.01); *G06Q 10/087* (2013.01); *G06Q 10/20* (2013.01); *G06Q 10/30* (2013.01); *G06Q 50/163* (2013.01); *G07C 9/00309* (2013.01); *G07C 9/37* (2020.01); *H04W 4/80* (2018.02); *H04W 84/12* (2013.01)

(58) Field of Classification Search
None
See application file for complete search history.

(56) References Cited

U.S. PATENT DOCUMENTS 8,854,180 B2 * 10/2014 Bacarella ............... E05G 1/026
340/5.6
2002/0145506 A1 * 10/2002 Sato ....................... G07C 9/27
340/5.7
(Continued)

*Primary Examiner* — Carlos Garcia
(74) *Attorney, Agent, or Firm* — Thomas H. Stanton

(57) ABSTRACT

The invention relates to a system for providing access information to a service provider for a property comprising of an apartment or condo association and for a specific apartment within the apartment or condo association. The system utilizes a software system to schedule the access for the service provider and automated lock management access control to control the access to the property and the specific apartment.

14 Claims, 23 Drawing Sheets

(51) Int. Cl.
*H04W 4/80* (2018.01)
*H04W 84/12* (2009.01)

(56) References Cited

U.S. PATENT DOCUMENTS

| | | | | |
|---|---|---|---|---|
| 2008/0162249 | A1* | 7/2008 | Leventhal | G06Q 30/016 |
| | | | | 705/26.1 |
| 2010/0253471 | A1* | 10/2010 | Abe | G06F 21/32 |
| | | | | 340/5.83 |
| 2012/0310695 | A1* | 12/2012 | Kestenbaum | G06Q 50/163 |
| | | | | 705/7.15 |
| 2015/0307273 | A1* | 10/2015 | Lyman | B65F 1/1615 |
| | | | | 705/26.61 |
| 2016/0117878 | A1* | 4/2016 | Pececnik | G07C 9/00571 |
| | | | | 340/5.53 |
| 2016/0300297 | A1* | 10/2016 | Kekalainen | G06F 17/18 |
| 2017/0223017 | A1* | 8/2017 | Kohli | H04L 63/0853 |
| 2017/0332232 | A1* | 11/2017 | Weinberg | H04W 12/02 |
| 2018/0005195 | A1* | 1/2018 | Jacobson | G06Q 10/1095 |
| 2018/0124564 | A1* | 5/2018 | Phillips | G08B 21/0272 |
| 2018/0240055 | A1* | 8/2018 | Theus | G06Q 50/163 |
| 2019/0253255 | A1* | 8/2019 | Mani | G07C 9/00 |
| 2020/0311633 | A1* | 10/2020 | Casagrande | G07C 9/00571 |
| 2020/0334344 | A1* | 10/2020 | Schwartz | H04L 63/0861 |

* cited by examiner

1. Accommodate for Assignment of Skill Mastery Levels (1410)
   1. Level 3 (Trained/Master/High) = 150   (1411)
   2. Level 2 (Backup/Apprentice/Medium) = 100   (1412)
   3. Level 1 (Untrained/Trainee/Low) = 50   (1413)

2. Accommodate for Location Assignment Priority (1420)
   1. Level 2 (Primary)   (1421)
   2. Level 1 (Secondary/Backup)   (1422)

3. Accommodate for On Site/Off Site Priority   (1430)
   1. See Fig. 15

4. Least Utilization, Rating, Favorite Status   (1440)

5. Travel Time   (1450)

| Inputs | | | | | | | | | | | |
|---|---|---|---|---|---|---|---|---|---|---|---|
| | Skill Level | Primary Location | Secondary Location | Customer preferred | Number of On Site assignments Rating | | Location Ranking | Available Slots | Availability Score | AM Availability Score | AM Score |
| Valet 1 | 150 | Y | Y | | 8 | 32 | 4 | 16 | 0.666667 | 186.6667 | 4 |
| Valet 2 | 150 | Y | X | | 4 | 16 | 2 | 20 | 0.833333 | 168.8333 | 8 |
| Valet 3 | 150 | Y | X | | 2 | 8 | 2 | 22 | 0.916667 | 160.0167 | 9 |
| Valet 4 | 150 | X | Y | | 12 | 48 | 4 | 12 | 0.5 | 202.5 | 2 |
| Valet 5 | 100 | Y | X | | 0 | 0 | 2 | 24 | 1 | 103 | 14 |
| Valet 6 | 100 | Y | X | | 6 | 24 | 2 | 15 | 0.625 | 176.625 | 7 |
| Valet 7 | 100 | X | Y | | 12 | 48 | 4 | 9 | 0.33333 | 202.3333 | 3 |
| Valet 8 | 100 | Y | X | | 8 | 32 | 2 | 12 | 0.5 | 184.5 | 5 |
| Valet 9 | 150 | Y | X | | 8 | 32 | 2 | 10 | 0.416667 | 184.4167 | 6 |
| Valet 10 | 150 | X | Y | | 17 | 68 | 4 | 5 | 0.208333 | 222.2083 | 1 |
| Valet 11 | 100 | Y | X | | 0 | 0 | 2 | 14 | 0.58333 | 102.5833 | 15 |
| Valet 12 | 100 | Y | X | | 0 | 0 | 2 | 10 | 0.41667 | 152.4167 | 12 |
| Valet 13 | 150 | Y | X | | 1 | 4 | 2 | 21 | 0.875 | 156.875 | 10 |
| Valet 14 | 100 | Y | X | | 1 | 4 | 2 | 23 | 0.95833 | 106.9583 | 13 |
| Valet 15 | 150 | Y | X | | 1 | 4 | 2 | 19 | 0.791667 | 156.7917 | 11 |

Fig. 20

METHOD OF PROVIDING CLIENT SERVICE

COPYRIGHT AND TRADEMARK STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention, and the applicants make no claim to any trademarks referenced.

CROSS-REFERENCE TO RELATED APPLICATIONS

This application claims priority from U.S. patent application Ser. No. 16/704,128, filed Dec. 5, 2019, entitled Method of Providing Client Service, and U.S. Provisional Patent Application No. 62/825,837, filed Mar. 29, 2019, entitled Method of Providing Client Service which is hereby incorporated by reference herein for all purposes.

BACKGROUND OF THE INVENTION

Field of the Invention

The invention relates to a system used to provide a variety of services to individual apartment or condominium clients, and, more particularly, to waste removal.

Description of Related Art

Society places significant demands and constraints on a family or an individual's time. The time constraints include school, work and social activities. Due to the time constraints, many households are utilizing service providers to assist them in meeting their obligations to their families by subcontracting services with private companies or independent contractors.

However, the process to secure reliable and cost-effective service providers is a difficult one. Companies such as Home Advisor and Thumbtack have grown to help solve the problem of finding reliable and skilled help for a variety of services including trash removal, cleaning, painting, plumbing and typical home maintenance tasks. A number of inventions have been described which propose solutions that meet a subset of the issues facing the property owners/manages and the property occupants.

However, for apartment and condominium occupants in large properties, there tends to be significant hurtles such as clearance to work in a specific property by the owner/manager. For example, the need for access to central control rooms such as telephone, internet power and plumbing as well as communication with the occupants to schedule tasks such as trash removal.

A common strategy, used by property management to control the service providers in a particular property, is to require insurance certificates, license information and utilization of property access control systems. All of these increase the cost to the property management which results in increased costs to the occupants of the property.

One way to eliminate the secondary tasks is for the property management company to either have approved subcontractors or maintenance and service providers on staff. However, this also increases the cost of maintaining the property to all the clients in the building.

Other systems have been developed to address the individual need for property security, licensed contractors, and approved contractors. However, this still places significant demands on the property management and does not create a central repository and methodology for managing the various contractor access and service times nor does it provide a list of contractors that are approved by the property management and are trained and have the required licenses.

Therefore, there is a need for a system that address all the property management needs and for managing the contractors supplying services to their community/property.

SUMMARY OF THE INVENTION

In a first implementation of the invention The invention in one form is directed to a system for a property manager, e.g., clients and property inhabitants. The system provides a secure way of furnishing customers with preapproved, trained and insured support personnel utilizing a secure access control system that limits access by support personnel to the property during only those times which the individual has scheduled appointments.

Services provided by the support personnel may include house cleaning, standard cleaning, trash removal, maintenance, dog walking, babysitting, pet sitting, painting, carpet cleaning, food preparation, food delivery, package delivery and general assistance.

The invention in another form provides a way of furnishing services that ensures the safety and security of other occupants of the property and ensures that the work meets all city, state and national regulations. To achieve this, the property management must have the appropriate documentation showing that the service providers are trained, insured and meet specific background check requirements.

In yet another form, the invention provides services for property occupants that comply with the owners or management company rules.

In yet another form, the invention provides services for property occupants in predetermined timeslots thereby allowing both the occupant and service provider to plan when the service is required by the occupant.

Another form of the invention provides services for property occupants that comply with city, state and federal regulations.

BRIEF DESCRIPTION OF DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

FIG. 14 shows enhanced requirements for the scheduling service as used in one embodiment of the invention;

FIG. 19 shows one form of on-site and offsite scoring logic method as used in one embodiment of the invention;

FIG. 20 shows another embodiment of the invention shown in FIG. 19;

DETAILED DESCRIPTION OF THE INVENTION

Figure 1:
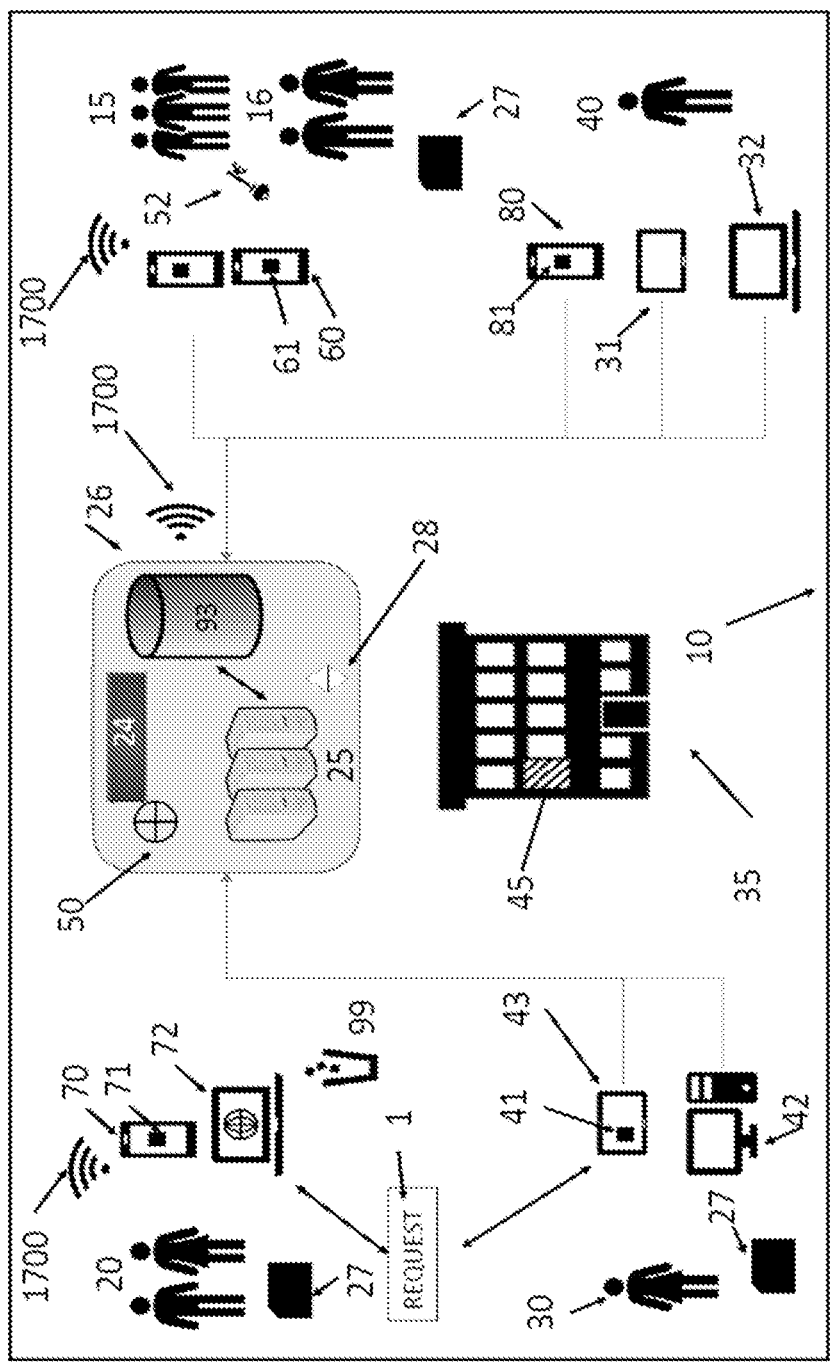
FIG. 1 shows an embodiment of an embodiment of the invention for a service system for supplying trained and validated personnel for occupants and managers (clients) of an apartment/condo property.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the In the following description, for the purposes of explanation, numerous specific details are set forth in order to provide a thorough understanding of the described embodiments. It will be apparent to one skilled in the art; however, that other embodiments of an embodiment of the invention may be practiced without some of these specific details. Several embodiments are described herein, and while various features are ascribed to different embodiments, it should be appreciated that the features described with respect to one embodiment may be incorporated with other embodiments as well. By the same token; however, no single feature or features of any described embodiment should be considered essential to every embodiment of the invention, as other embodiments of the invention may omit such features.

In this application internet protocol, the Transmission Control Protocol (TCP) and the Internet protocol suite and the term TCP/IP are used interchangeably.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

The following terms as used within the description of the invention are defined.

The use of the term pass lock control information or pass code are used interchangeably.

The use of the term "Employee" is valet, worker, supervisor, district manager etc.

The use of the term "Customer" and "occupant" are an end user of resident apartment.

The use of the term "Valet/Service Provider" are workers, employees or contractors who do the cleaning, pet walking, runners, concierge etc. and are used interchangeably.

The term service can be any type of service such as trash collection, laundry service, food delivery, maintenance service, cleaning service etc.

The use of the term "Timeslot" is a basic time unit used to divide the working hours of services and employees.

The term timeslot and slot are used interchangeably to mean timeslot.

The use of the term "Customer Service Requests/Service request/Order" is the basic object used for all the operations. This is the order (shell/actual) containing service, customer, employee and other order details.

The use of the term "Service" is home cleaning, pet walking, trash pick-up etc.

The use of the term of Condominium, Co-Op, apartment, residence refers to a housing unit where the customers own their individual living unit or household.

The use of the term of property refers to a multi-unit housing facility.

The use of the term "Living Unit" or "Household" both refer the individual apartment which is inhabited by a customer.

The use of the term "Virtual Valet" (Liv) is a default fallback valet who is presented to the customer or to whom the tasks are assigned if there is no automated fulfillment for service/assignment for a service or if all the valets are busy.

The use of the term "Bookings" is a status with the following possible states Available, Reserved and Confirmed service.

The use of the term "Service Slots" refers to the time interval when the service is offered, e.g., a two hour duration for a standard cleaning will generate service slots for 7 am, 9 am, 11 am, 1 pm etc.

The use of the term "Quota" refers to a list of available/eligible employees for all the service slots in a given period, e.g., available employee for each service slot in a day for a deep cleaning.

The use of the term "Client" refers to the managers of the apartment or condominium property and the terms are used interchangeably in the specification.

The use of the terms "access control", "integrated security system", "security system" and "access control management system" refer to providing access control to specific individuals at specific times.

The use of the term "access electronic communication device refers to electronic communication devices including smart phone and their applications, smart tablet and their applications and desktop computers and their application and any derivative thereof.

The invention is a system for the management of service suppliers for customers or clients of an apartment or condo association.

The system is based on Quotas which are used by the system to create and manage regions, markets, and each property in the above order of hierarchy. Quotas may be used to create and manage the roles of management and employees. Management may include of Regional Vice President (RVP), Regional District Operations Manager (RDO), and District Managers (DM) and employees may include Service Providers/Valets, e.g., door valets or home valets.

Quotas may be used to create and manage skills, shifts and request for service/assignment of service providers/valets to their respective properties.

Quotas may be used to inspect and manage tasks, task request for service/assignment and escalations across the country for an RVP, across assigned Regions for an RDO and across properties for a DM. RDOs will be assigned communities by the RVPs. DMs will be assigned communities by the and RDO or RVPs. Once an RDO has been assigned a district they will have access to the module and functionality to the "DM Management module" and have the same permissions as the RVP to this module. The structure may be a classical pyramid management structure. However, the structure allows flexibility so that the organization can provide excellent service and the roles to change as needed.

Quotas may be used to view and accept/reject individual task request for a service/assignment or request across properties for valets. Service Providers/Valets can only view their individual schedules and task requests for service/assignment or request, across communities within a district/territory. Reassigning valets from one district to another can be done temporarily or permanently and is an HR page/function. A DM can manage service providers/valets shifts and schedules for their assigned district/territories and the communities within that area. An RDO has the ability to manage across their assigned regions. An RVP can access all the modules. Communities are organized by cities and each community has a main address, street address and building address. Each territory may be defined by a unique identifier. Each territory may be divided into districts. Cities may be associated with districts. Communities may be associated with cities. Communities may be assigned the following designators: included but not limited to 1) Concierge, 2) App only, or 3) Neither. Concierge designated communities have concierge hours recorded, services and sub services available and the time the services are available. Service Start and Service End may be defined at the service level or completely at the subservice level. Typical services include but are not limited to security services, vehicle valet and parking services, fitness and wellness services, event planning, grooming and beauty/salon services, physical therapy, laundry, doorstep, dog walking, cleaning, trash pickup, maintenance, repairs and painting. For each selected subservice, the system provides the ability to add/delete/edit tasks within a task list and the tasks are then displayed to the assigned to a valet. However, certain services such as doorstep service do not have a sub-service category.

A DM, RVP and RDO via a module in the system app have the ability to view and manage valets who have been hired and preassigned to a district. This may be a list that comes from the HR module. This module allows them to assign valets from one community to another and to edit valet profiles, such as email, phone, name, skills, picture of valet, etc.

The skills field may have three options: Trained, Untrained or Backup, who is also trained in the field. A valet may be associated with a community as primary or secondary, a valet can be assigned as primary or secondary to one or more communities but there must be at least one primary assigned community.

The system also keeps track of earnings, tips, ratings and feedback for each valet.

One embodiment of an embodiment of the invention eliminates the issues experienced by the property owners, property manager, i.e., clients, service providers such as telephone, cable, water, gas and electricity as well as the other inhabitants of the property by providing prequalified service providers that are trained and have access to the property via the security system of the property. That security system is unique and specific to each request for service/assignment or request service event and allows the service personnel to enter the property and only go to the specific living unit or household during a specific window of time and limits that access after the request for service/assignment is complete. The security system only allows access to the specific unit during a specified request for service/assignment to the unit being serviced.

The security system of an embodiment of the invention is an integrated service platform with access control for the technology to communicate with door locks from an integrated application which resides on the service personnel smart phone. The integration of the device platform and an access control system for the method of accessing units creates a secure and safe method of providing services for a property which forms the basis for the access control management system to protect both the property and the customers and inhabitants of the property.

One embodiment of the invention is designed to allow customers to schedule services needed using either a mobile application or computer and selecting the service they require. The process can be viewed from two perspectives.

In another embodiment, the customer goes to the service provider selection tool and selects a specific service provider using the service provider selection tool or is provided with a general unspecified provider that is assigned by the system software that controls scheduling the providers. Once the customer has selected the provider, they may then select the time frame for the service needed based on the service providers current commitments and schedules. After having selected the provider and the desired time for the service, the customer can book the service and the security system of an embodiment of the invention schedules the access control for the specific door locks from an integrated access control management system which resides on the service personnel smart phone.

In another embodiment, the customer goes to the service provider selection tool and selects the service they need. Then the customer can select the time they need the service which brings them to the service provider selection tool. The service provider selection tool allows them to select a specific provider or the system will provide them a general unspecified provider which is assigned by the system software that controls scheduling the providers. After having selected the provider and the desired time for the service, the customer can book the service and the security system of an embodiment of the invention schedules the access control for the specific door locks from an integrated access control management system which resides on the service personnel smart phone.

If the customers cannot find a service provider to provide the desired service during the window of time they desire, the system will provide them with alternative times either prior to or after the desired time allowing them to select one of those service providers to meet their needs. The customer can also select alternate days and times until they find a time and provider that they are comfortable with.

At the time of the service, the service provider is provided access to the property and the specific unit by way of the integrated security system. The system can book the service and the security system schedules the access control for the specific door locks from an integrated access control management system which resides on the service personnel smart phone.

The clients who are the property owners or manager can access the system and they may allow the service provider(s) access by way of the access control management system. The clients can also review the service provider's qualifications, security documents and service record to ensure that the service provider is cleared for access to the property and qualified to perform the specific service.

The service provider(s) can either be employers of the service company or independent contractors that sub contract work through the service company. This makes the service company responsible for maintaining adequate security, training, access control, schedule and location documentation on the service provider, which is available to the property manager, i.e., clients, and the customers.

The system databases are connected to all the modules including access management, order management, scheduling, personnel database, property data etc. and contains the relevant data to support the module objectives.

The personnel data stored on the databases and include for each employee, e.g., doorstep valet personnel or home valet personnel their training, type of service, primary and secondary service locations, service qualifications and work hours.

Figure 9:
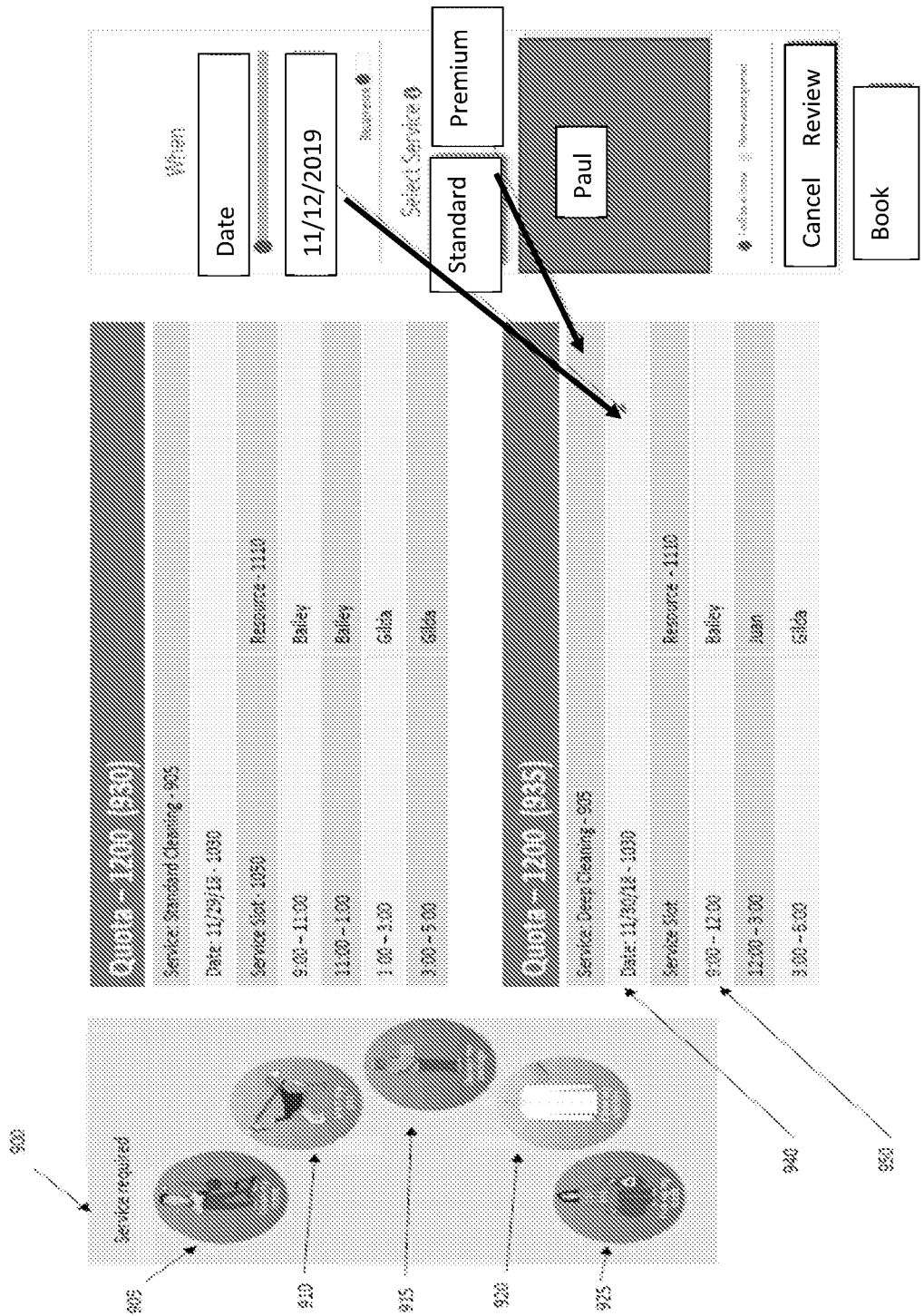
FIG. 9 is a detailed view of the system resource Scheduling Service.

Referring now to the drawings, and more particularly to FIG. 1, there is shown an embodiment of the architecture for an embodiment of the invention which provides a service system 10 for supplying trained and validated service provider doorstep valet personnel 15 or validated home valet personnel 16, for occupants 20 and property manager 30, i.e., clients, of an apartment/condo property 35. The property manager 30, i.e., the clients, are electronically connected to the server 25 using an electronic communication device such as a tablet/smart phone 43 or PC 42 which provides them access to the service providers managers 40 and to the individual doorstep valet personnel 15 or home valet personnel 16 service provider using tablet/smart phone 60 and application 61. This type of configuration is used to provide services such as waste container 99 for the whole property such as trash removal, common area maintenance, lawn and garden care, and/or snow removal. Referring to FIG. 1 and FIG. 9 the property manager 30 can submit a request for service/request for service/assignment 1 required using tablet/smart phone 43 of PC 42 and application 41 and specify the service date 1030 and the service slot 1050 when the service is needed which corresponds to the time window when the service is needed. Specifically, the service slot 1050 refers to the time interval when the service 99 is offered or needed. The service slot 1050 window information may include service date 1030, start time 1031 and length of the service in timeslots increments 1050. The time slot increments 1050 are customizable, e.g., 5, 10, 15, 20, or 30-minute segments. The processing system 26 utilizes server 25 then uses database 93, load balancer program 24, the integrated access management system 28 and the information entered by the property manager 30 and the scheduling software 50 to compare the availability of a doorstep valet personnel 15 or home valet personnel 16 service provider to provide the service and what timeslots 1050 they currently have available to perform the service 99 by way of their an electronic communication device, such as a smart phone 60 running an application 61. Only qualified doorstep valet personnel 15 or home valet personnel 16 service provider and those that are cleared by the property manager 30, i.e., client, is displayed with their available timeslots 1050. The list of available service providers is returned to the property manager 30, i.e., client, and is arranged in order of preferred time slot 1050. The manager 30 can then review the available timeslots 1050 for the service and the doorstep valet personnel 15 or home valet personnel 16 service provider availability using their electronic communication device, such as a smart phone or tablet 43 and PC 42 using application 41. The property manager 30 can also review the qualifications and satisfaction report of the doorstep valet personnel 15 or home valet personnel 16 service provider and then select the doorstep valet personnel 15 or home valet personnel 16 service provider they want in the specific time slot 1050. If there is not a specific doorstep valet personnel 15 or home valet personnel 16 service provider available, the system can return a generic service provider who may be assigned to that request for service/assignment 1 at the desired time slot 1050. Once the service provider and time slot request for service/assignment 1 have been confirmed, the scheduling software schedules the service provider and returns a confirmation to the client. If required, the scheduling software, utilizing the integrated access control management system, schedules the access for the property and specific unit where the request for service/assignment 1 is requested. The scheduling software then sends the confirmation and request for service/assignment 1 to the doorstep valet personnel 15 or home valet personnel 16 service provider with the necessary access control information. The access control information only allows access to the property and/or unit to provide the service for a suitable period of time. The scheduling software also sends an invitation to the affected customers or property manager 30, i.e., clients, providing them with the window when the service will be provided. The scheduling process can be overridden or modified by the company manager 40 if there are conflicts with the request 1 or priorities change. The affected parties are notified via the processing system 26, so they can confirm availability and acknowledge the change.

The customer 20 can also send a service/assignment 1 to the doorstep valet personnel 15 or home valet personnel 16 service provider using their using their Electronic communication device such as a smart tablet 70 and desktop 72 using application 71.

The load balancer program 24 which is part of processing system 26 residing utilizing server 25 optimizes the service/assignment 1.

The embodiment of FIG. 1 can be specifically demonstrated by the following example. The property manager 30, i.e., client, needs to schedule door side trash removal which is a service/assignment 1. The manager 30 determines the need for the trash pickup and using the processing system 26 residing on the server 25, they select a time slot 1050 and doorstep valet personnel 15 service provider for the service/assignment 1. The processing system 26 using the scheduling software 50 and the integrated access management system 28, provides the schedule to the doorstep valet personnel 15 service provider and access control information 52. The scheduling processing system 26 alerts the customers that trash pickup will occur during the specific times 1050 and that they should have their trash placed appropriately outside their door between the following times service slot 1051.

The doorstep valet personnel 15 or home valet personnel 16 service provider arrives at the property 35 and provides the trash pickup. If a customer does not have trash outside of their door or the trash is inappropriately packaged the doorstep valet personnel 15 or home valet personnel 16 service provider notes the condition using an electronic communication device such as their smart phone 60 using application 61 to capture the issue and the problem being reported. The application 61 can also capture the time and date that the service request 27 was provided.

Figure 2:
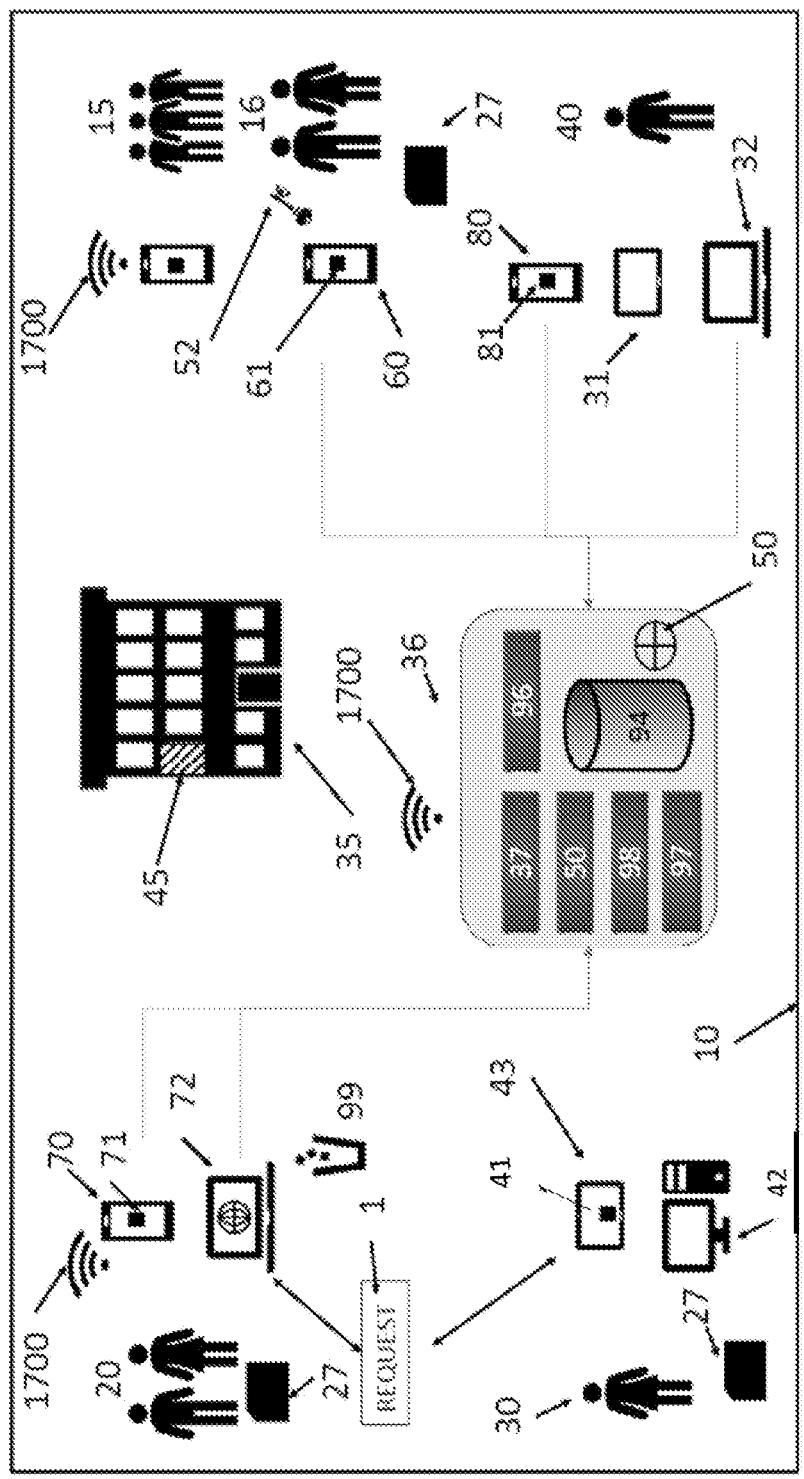
FIG. 2 an alternate embodiment of an embodiment of the invention for a service system for supplying trained and validated personnel for occupants and managers (clients) of an apartment/condo property.

FIG. 2 shows an alternative embodiment of a service system 10 for supplying trained and validated personnel for occupants of an apartment/condo property with scheduling software, order management and fulfillment manager, all modules having access to the system database. This embodiment connects the individual customers with the service providers by using the system to select a service needing to be performed such as dog walking, pet sitting, cleaning, standard cleaning, laundry pick up, maintenance, painting, carpet cleaning, and/or food preparation. The customer can submit a request for service required and specify the service slot 1050 window when the service is needed. The service slot 1050 window that corresponds to service slots, refers to the time interval when the service 99 is offered or needed. That window information will include date, start time and window of the service. The system 36 utilizing server 37 then uses database 94, scheduling software 50, work queue manager 98, information entered by the property manager 30 and the scheduling software 50 to compare the availability of a doorstep valet personnel 15 or home valet personnel 16 service provider to the requested service and determines the timeslots 1050 currently available to perform the service 99 by way of their electronic communication device such as smart phone 60 using application 61 and then uses that information and the scheduling software to compare the availability of a service provider to provide the service and what timeslots they currently have available to perform the service. Only qualified doorstep valet personnel 15 or home valet personnel 16 and those that are cleared by the property manager 30 are displayed and their available service slot 1050. The list of available doorstep valet personnel 15 or home valet personnel 16 service providers is returned to the customer and is arranged in order of preferred time slot. The client can then review the available timeslots for the service and the service provider available. They can also review the qualifications and the doorstep valet personnel 15 or home valet personnel 16 service providers satisfaction report and select the doorstep valet personnel 15 or home valet personnel 16 service provider they want and the specific service slot 1050. If there is not a specific doorstep valet personnel 15 or home valet personnel 16 service providers available, the service system 10 can return a generic service provider who will be assigned to that request for the service/assignment land service system 10. Once the doorstep valet personnel 15 or home valet personnel 16 service provider and service system 10 request for service/assignment 1 have been confirmed, the scheduling software 50 schedules the service provider and returns a confirmation to the customer. The scheduling software, utilizing the integrated access control management system, schedules the access for the property and specific unit where the request for service/assignment 1 is requested and then sends the confirmation and request for service/assignment 1 to the doorstep valet personnel 15 or home valet personnel 16 service provider with the necessary access control information 52. The access control information only allows access to the property and or unit to provide the service for a predetermined period of time during select service slots 1050. The scheduling software also sends an invitation to the customers 20 and/or property manager 30 by providing them the service slots 1050 window when the service 99 will be provided. The scheduling process can be overridden or modified by the company manager 40 if there are conflicts with the request or priorities change. The affected parties are notified via the system 10, so they can confirm availability and acknowledge the change.

The embodiment of FIG. 2 can be specifically demonstrated by the following example.

The customer needs to schedule a standard cleaning service 99. The customer, using the processing system 26 utilizing the server 25 selects a service date 1030, a service slot 1050 and doorstep valet personnel 15 or validated home valet personnel 16 service provider for the requested service/assignment 1. The service system 10, utilizing processing system 26 using database 94, the scheduling software 50, order manager 97, work queue manager 98, administration module 96 and the integrated access management system 28, provides the schedule to the doorstep valet personnel 15 or validated home valet personnel 16 service provider and access control information 52. The scheduling processing system 26 alerts the customer 20 that standard cleaning will occur during the specific times conforming to service slot 1050 and that they should be prepared for the doorstep valet personnel 15 or validated home valet personnel 16 service provider, so they can compete the request for service/assignment 1.

The doorstep valet personnel 15 or validated home valet personnel 16 service provider arrives at the property 35 and provides the standard cleaning service 99. If a customer is not ready for the service 99, the doorstep valet personnel 15 or validated home valet personnel 16 service provider notes the condition using their electronic communication device such as smart phone application 61 to capture the issue and the problem being reported. The electronic communication device such as smart phone application 61 can also capture the time and date that the service 99 was provided.

Figure 3:
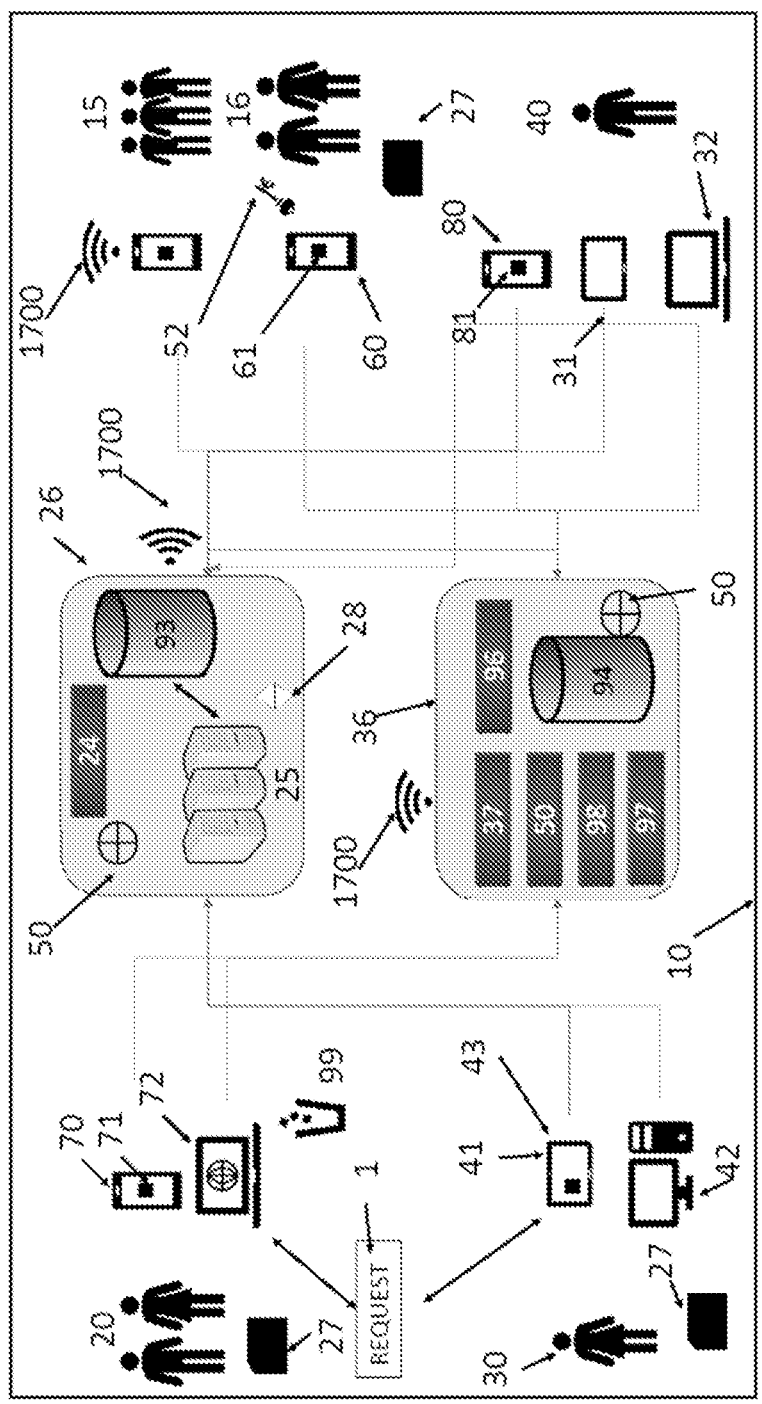
FIG. 3 shows an alternative embodiment of an embodiment of the invention shown in FIG. 1.

FIG. 3 shows an alternative embodiment of a service system for supplying trained and validated personnel for occupants and managers of an apartment/condo property with scheduling software, order management and fulfillment manager with home access.

The embodiment of FIG. 3 connects the individual customers 20 and clients 30 with the doorstep valet personnel 15 or validated home valet personnel 16 service provider by using the service system 10 to select a service 99 needing to be performed such as lawn and garden services, trash pickup, dog walking, pet sitting, cleaning, laundry pick up, maintenance, painting, carpet cleaning and/or food preparation. The customer 20 or client 30 can submit a request for service required and specify the window when the service 99 is needed based on a service date 1030 and service slots 1050. The window corresponds to service slots 1050 which refers to the time interval when the service 99 is offered or needed. That window information will include service date 1030, start time and window of the service in service slots 1050. The service system 10 then uses that information and the scheduling software 50 to compare the availability of a doorstep valet personnel 15 or validated home valet personnel 16 service provider to provide the service 99 and also determine available timeslots to perform the service. Only qualified doorstep valet personnel 15 or home valet personnel 16 and those that are cleared by the property manager 30 are displayed with their available service slots 1050. The list of available doorstep valet personnel 15 or home valet personnel 16 service providers is returned to the customer 20 and is arranged in order of preferred service slots 1050. The client can then review the available service slots 1050 for the service 99 and the doorstep valet personnel 15 or home valet personnel 16 service provider available. The client 30 or customer 20 can also review the qualifications and the doorstep valet personnel 15 or home valet personnel 16 service providers satisfaction report and select the doorstep valet personnel 15 or home valet personnel 16 service provider they want and the specific service slots 1050. If there is not a specific doorstep valet personnel 15 or home valet personnel 16 service provider available, the system can return a generic service provider who may be assigned to that request for service/assignment 1 and desired service slots 1050. Once the service provider and the time slot request for service/assignment 1 have been confirmed, the scheduling software 50 schedules the doorstep valet personnel 15 or home valet personnel 16 service provider and returns a confirmation service request 27 to the customer. The scheduling software 50, utilizing the integrated access control management system 28, schedules the access for the property 35 and specific unit 45 where the request for service/assignment 1 is requested and then sends the confirmation service request 27 and request for service/assignment 1 to the doorstep valet personnel 15 or home valet personnel 16 service provider with the necessary access control information 52. The access control information 52 only allows access to the property 35 and or unit 45 scheduled to provide the service for a suitable period of service slots 1050. The scheduling software 50 also sends an invitation to the customers 20 and/or property manager 30 by providing them the window service slots 1050 when the service 99 will be provided. The scheduling process can be overridden or modified by the company manager 40 if there are conflicts with the request or priorities change. The affected parties are notified via the processing, so that they can confirm availability and acknowledge the change.

The embodiment of FIG. 3 can be specifically demonstrated by the following example. The client or customer 20 needs to schedule a cleaning service 99. For the customer 20 the service needed could be either a deep cleaning or a standard two-hour cleaning. Client 30 requested cleanings are usually final rental deep cleaning or move in cleaning. The customer 20 or client 30 using the processing system 26 residing on the server selects a service date 1030 and a service slot 1050 and doorstep valet personnel 15 or home valet personnel 16 service provider for the request for service/assignment 1. The system using the scheduling software 50 and the integrated access management system 28 provides the schedule service request 27 to the doorstep valet personnel 15 or home valet personnel 16 service provider and access control information. The scheduling processing system 26 alerts the customer/client that cleaning will occur during the specific times and that they should be prepared for the doorstep valet personnel 15 or home valet personnel 16 service provider to complete the request for service/assignment 1.

The doorstep valet personnel 15 or home valet personnel 16 service provider arrives at the property and provides the cleaning service 99. If a customer 20 or client 30 is not ready for the service, the doorstep valet personnel 15 or home valet personnel 16 service provider notes the condition using their electronic communication device such as a smart phone application 61 to capture the issue and the problem being reported. The electronic communication device such as a smart phone application 61 can also capture the time and date that the service 99 was provided.

Figure 4:
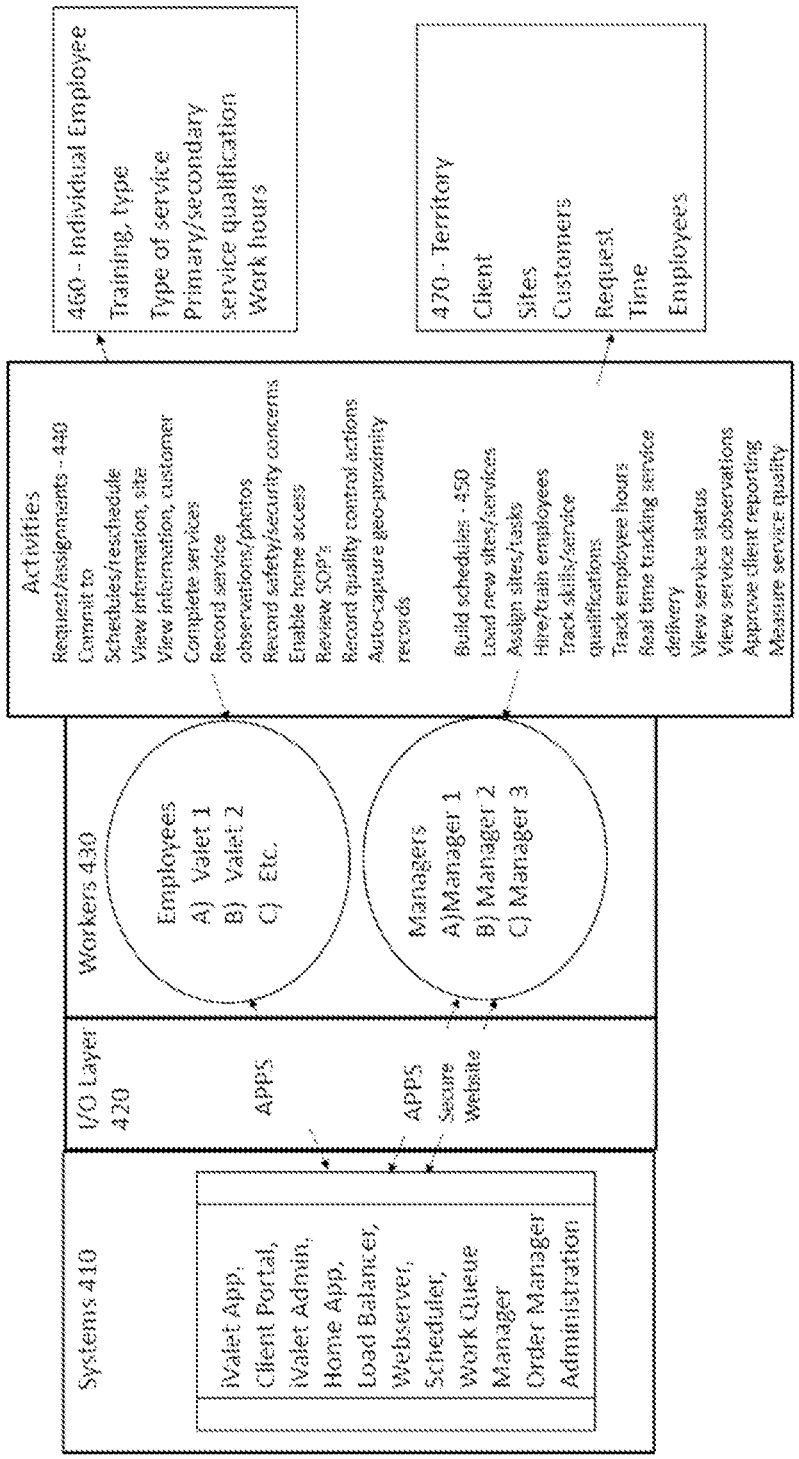
FIG. 4 is a flow chart of how the server communicates with the service providers, employee and territory information to develop a schedule.

Using FIG. 4 provides a more detailed flow chart of how the system webserver communicates with the doorstep valet personnel 15 or home valet personnel 16 service providers and employee and territory information to develop a schedule. The webserver has the following functions built into it to provide a scheduler function, an order manager 97, work queue manager 98, administration module 96, work queue manager 98 function, and a load balance function 24. The scheduler function is used to identify and schedule doorstep valet personnel 15 or home valet personnel 16 service providers for specific requests from customers and clients. The work queue manager 98 function allows the company management to see a complete picture of the work load with respect to individual doorstep valet personnel 15 or home valet personnel 16 service providers, an individual property 35, individual communities, individual territories, regions, and is capable of rolling up to national reporting. The order manager 97 function allows the company manager to view the orders and manage staff and resources to meet the orders. The load balance function allows the company manager to adjust the load by moving resources and the administration module allows the company manager to update training, satisfaction records, schedule information, region and property information. The load balance also allows the property manager 30 to grant access to their property 35.

The applications are connected to the system webservers 25 and 36 and the employees and managers through their electronic communication device such as devices smart phone 60 using application 61, smart phone 60 using application 81, smart tablet 31 and desktop 32 using application 81. The employee's doorstep valet personnel 15 or home valet personnel 16 can look at a request for service/assignment 1, completion information, lock information 52, property 35 information and customer 20 information. For each employee, e.g., doorstep valet personnel 15 or home valet personnel 16, the system database 93 and 94 has their training, type of service, primary and secondary service locations, service qualifications and work hours.

The systems 410 which include an embodiment of the invention App, Client Portal, instant invention Admin, Home App, Load Balancer, Webserver, Scheduler, Work Queue Manager, Order Manager, Administration communicates with both the workers 430 using I/O layer 420 applications and compiles the request/assignments activities 440 and the schedule 450 activity which reference the employee information 460 and the territory information 470.

The managers can manage request for service/assignment 1 and completion information and they may view the business such that it can be broken down by property, territory, e.g., a group of properties, client, sites, i.e., property, customer and request time.

Figure 5:
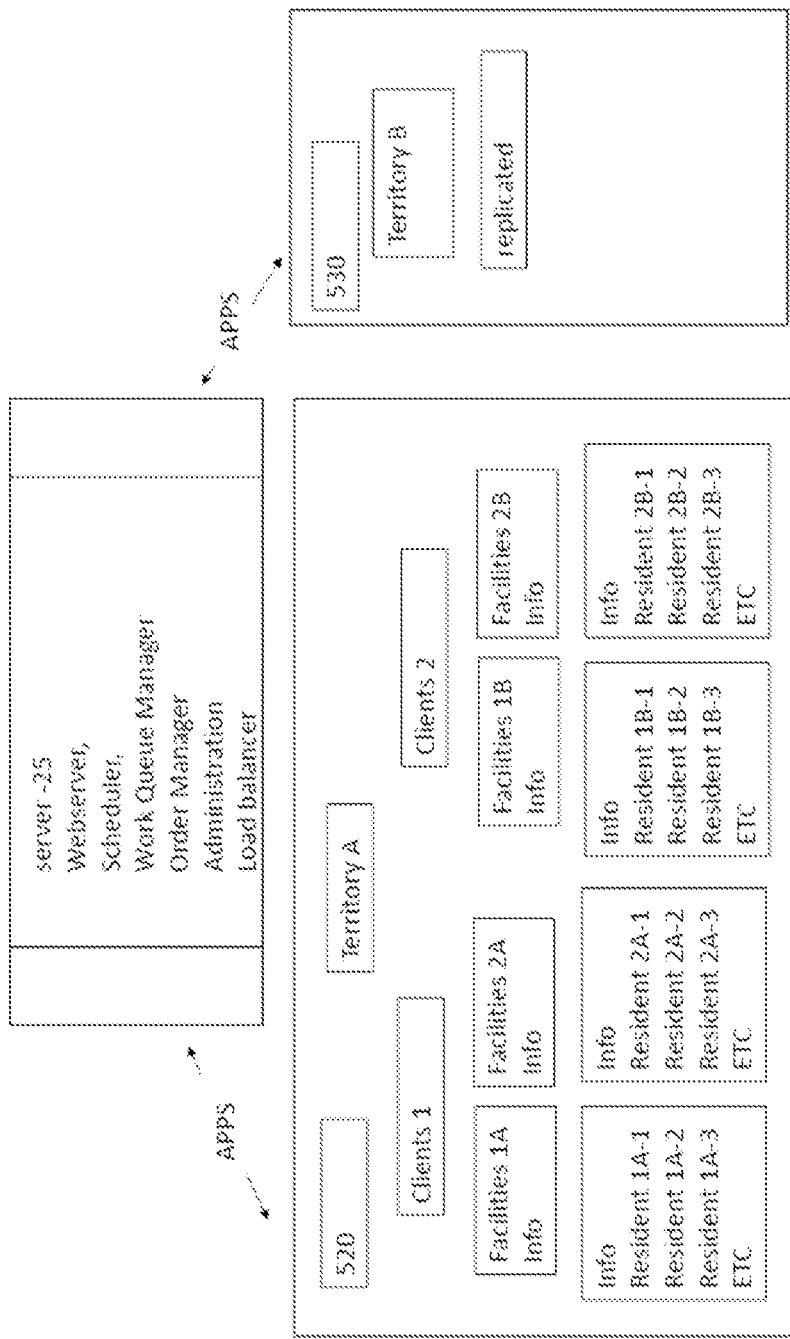
FIG. 5 is another flow chart of how the system webserver communicates with the clients and customers.

Using FIG. 5 provides a more detailed flow chart of how the processing system 26 utilizing servers 25 and 36 communicates with the client 30 and customer 20. The processing system 26 can view each territory 520 and resolve the territory 520 by clients 30, property 35 and customer/resident 20 information.

Figure 6:
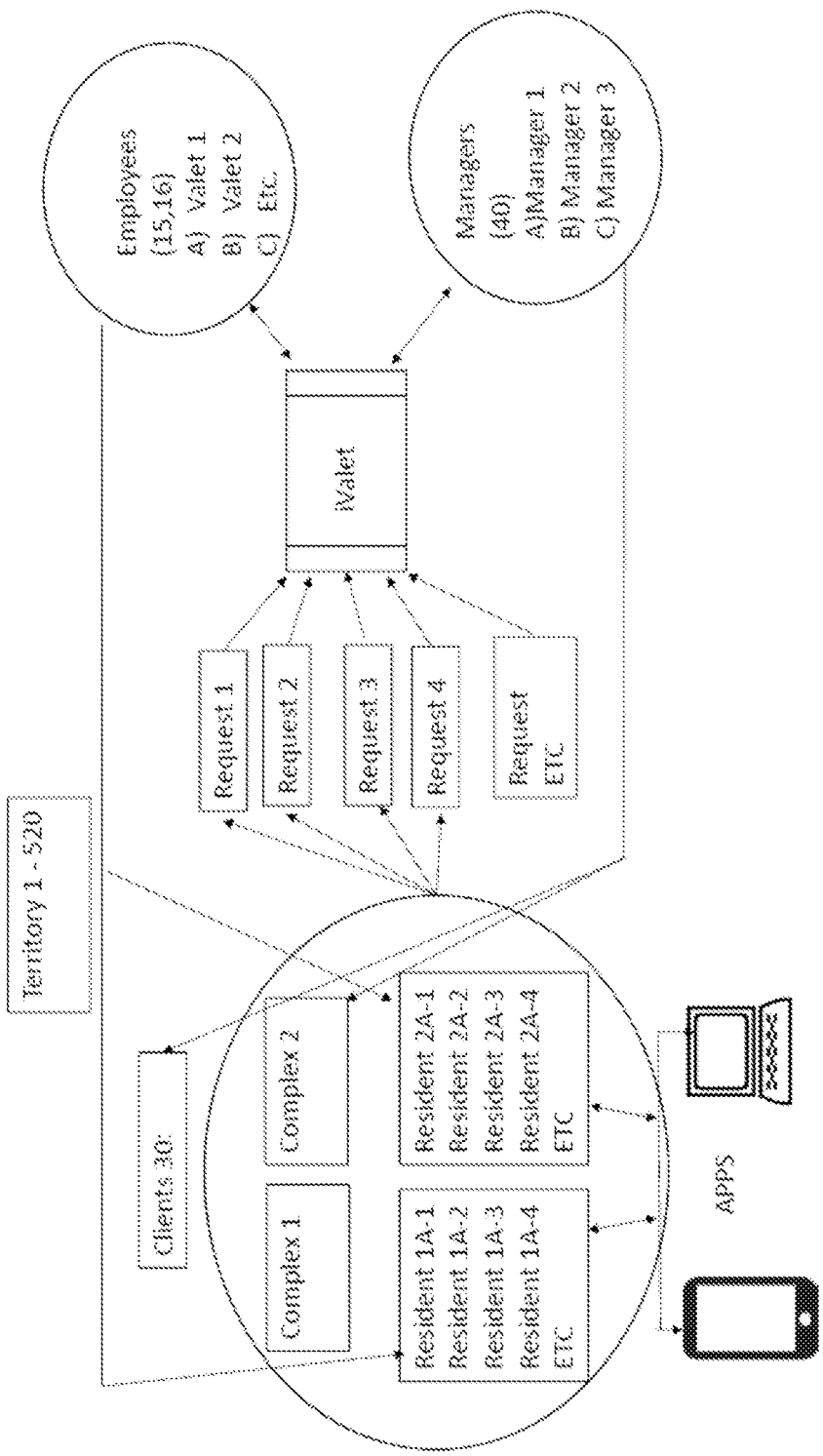
FIG. 6 is another flow chart of how the system web server communicates with the employees, company managers, clients and customers.

Using FIG. 6 provides a more detailed flow chart of how the service system 10 server 25 communicates with the employees 15, 16, company managers 40, clients 30 and customers 20. The server 25 can view each territory and resolve the territory by clients 30, property and customer/resident 20 information. The server 25 can accept customer 20 request for service/assignment 1 and then match them with a doorstep valet personnel 15 or a home valet personnel 16 service providers.

Figure 7:
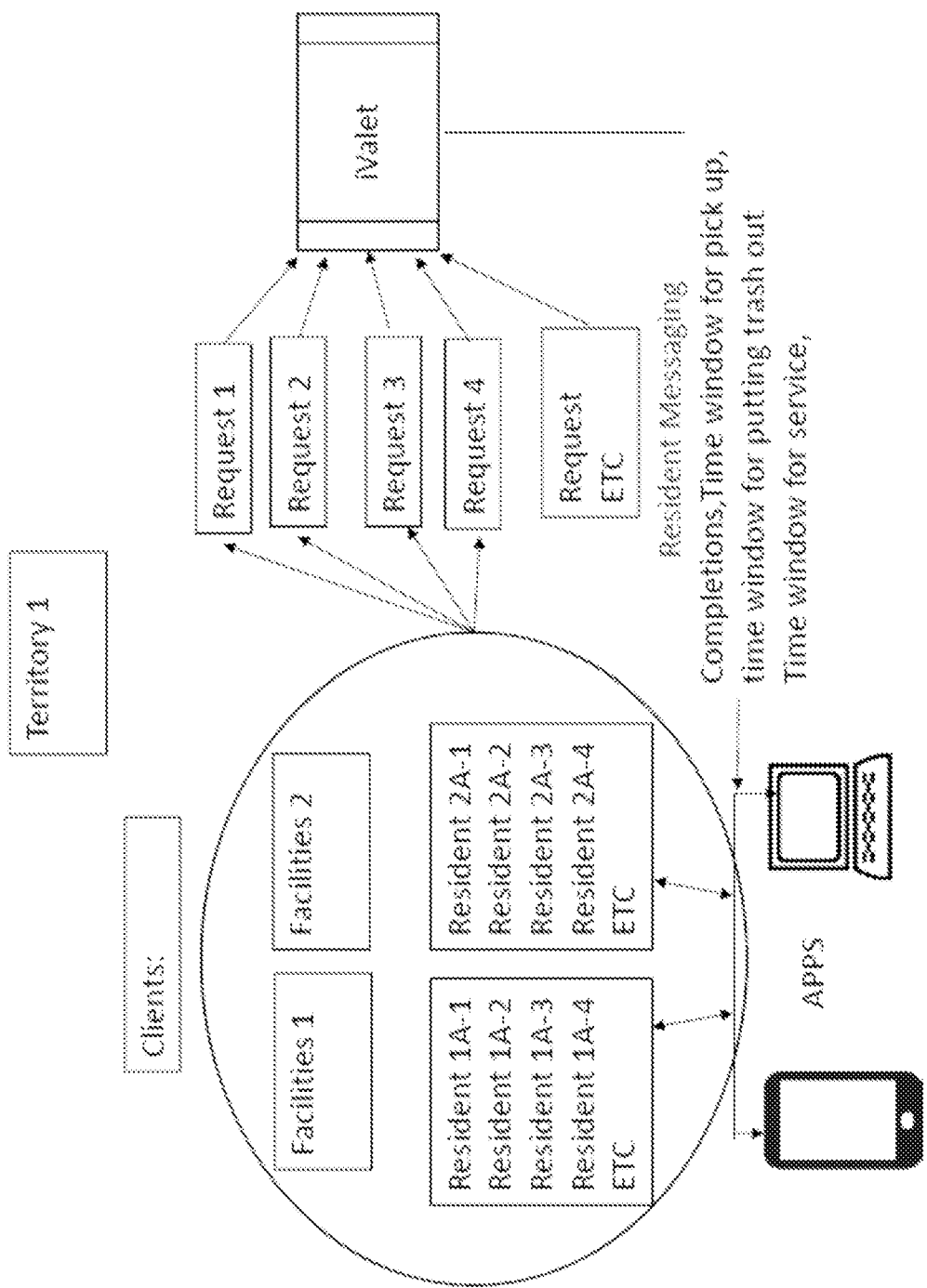
FIG. 7 is another flow chart of how the system web server communicates with the clients and customers and provides information to the customers.

Using FIG. 7 provides a more detailed flow chart of how the system server 25, 36 communicates with the client 30 and customers/resident 20 and provides information to the customers 20 on completion and time window for service.

Figure 8:
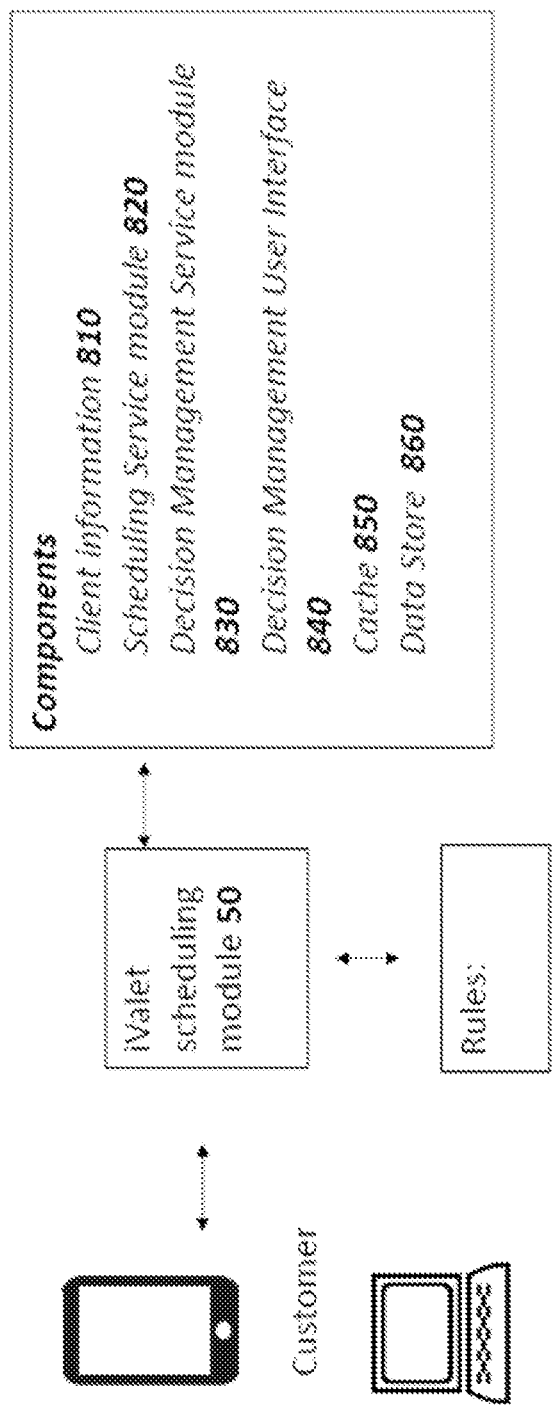
FIG. 8 is another flow chart of how the scheduling module of the webserver interfaces with the customer and applying the system rules for the service provider by pairing them with Client information, Scheduling Service module, Decision Management Service module, Decision Management User Interface, Cache and Data Store.

Using FIG. 8 provides a more detailed flow chart of how the scheduling module of the server 25, 36 interfaces with the customer and applies the system rules for the doorstep valet personnel 15 or home valet personnel 16 service provider such as availability, primary property and secondary property. The server 25, 36 also pairs the rules with scheduling software 50 having client information 810, scheduling service module 820, decision management service module 830, decision management user interface 840, cache 850 and data store 860.

Using FIG. 9 provides a more detailed description of the scheduling service. Shown is a system resource that provides a single day 1030 quota 1200 for the requested customer-facing service, such as cleaning or pet-walking. The quota is the list of selected resources that can complete the job.

Service required field 900 provides a list or graphics of the services 99 available in the specific property 35 for the customer 20. The server 25, 36 may also display the different type of services associated with the service 99 selected. In the example shown in FIG. 9, the service required field 900 lists five services 99 available. The services 99 are, clean my house 905, visit my pet 910, deliver my package 915, clean my clothes 920, and pick up my trash 925. For this example, the customer selects the clean my house 905 icon from the menu of services 99 available and the server 25, 36 will display the different service quota menus 930, 935 under the service required available for that menu item. In this instance, it displays standard cleaning 930 and deep cleaning 935 quota menus. The quota menus will also display the availability date, service slot and the doorstep valet personnel 15 or home valet personnel 16 service provider available during the specific slot to provide the service. When selected, the service date 940 and the service slot 950 will display the price and will allow the customer to cancel, review or book the service. Once the service 99 is booked, the customer is billed for the service and sent a service request 27 notification reminding the customer of the date, time and who the doorstep valet personnel 15 or home valet personnel 16 service provider is. Additionally, the doorstep valet personnel 15 or home valet personnel 16 service provider will be notified and scheduled so they can supply the service.

The scheduling service planner utilizes a time slot, a service slot 1050, booking, order, task, service hours and employee working hours.

The time slot is configurable for a minimal assignable time duration such as 30 minutes. However, the duration can be configured to suit the location and the request for service/assignment 1 types.

The service slots may be a predefined period of configurable duration that can be booked by resident. Service slots are calculated based on service duration and service hours. Each community has configurable service slots for each service The booking is a request for service/assignment 1 of a resource, with a specific skill, to perform the order at a specific time, e.g., service slot.

The order is a customer work order to perform a certain job at their home.

The task is an activity that can be performed by a single resource at one time during order fulfillment. Some orders contain a single task, e.g., a thirty-minute pet visit. Some orders include multiple tasks, e.g., two pet visits a day=two tasks.

The service hours are hours of operations for the service at a given community. A given community has established service days and times which are community service hours. They are typically set by the property management or clients. However, the actual service hours may vary. The typical property can have between 200-300 units and takes time to collect the trash. So, the processing system 26 may schedule a doorstep valet personnel 15 service provider to collect multiple properties during their work hours. As such, sometimes a given community may be actually collected early in the "window" of time at the community and sometimes later. As an example, the first community will likely have actual service hours of 8:15 AM to 9:30 AM and the 2nd may be 9:45 AM to 10:00 AM. This enables the resident's visibility to the actual service hours nightly.

The employee working hours are a doorstep valet personnel 15 or home valet personnel 16 service provider schedule for a given day. Note that a doorstep valet personnel 15 or home valet personnel 16 service provider may work at multiple communities, where they are available to be booked at any of these communities during the employee work hours, i.e., first come-first served.

Figure 10:
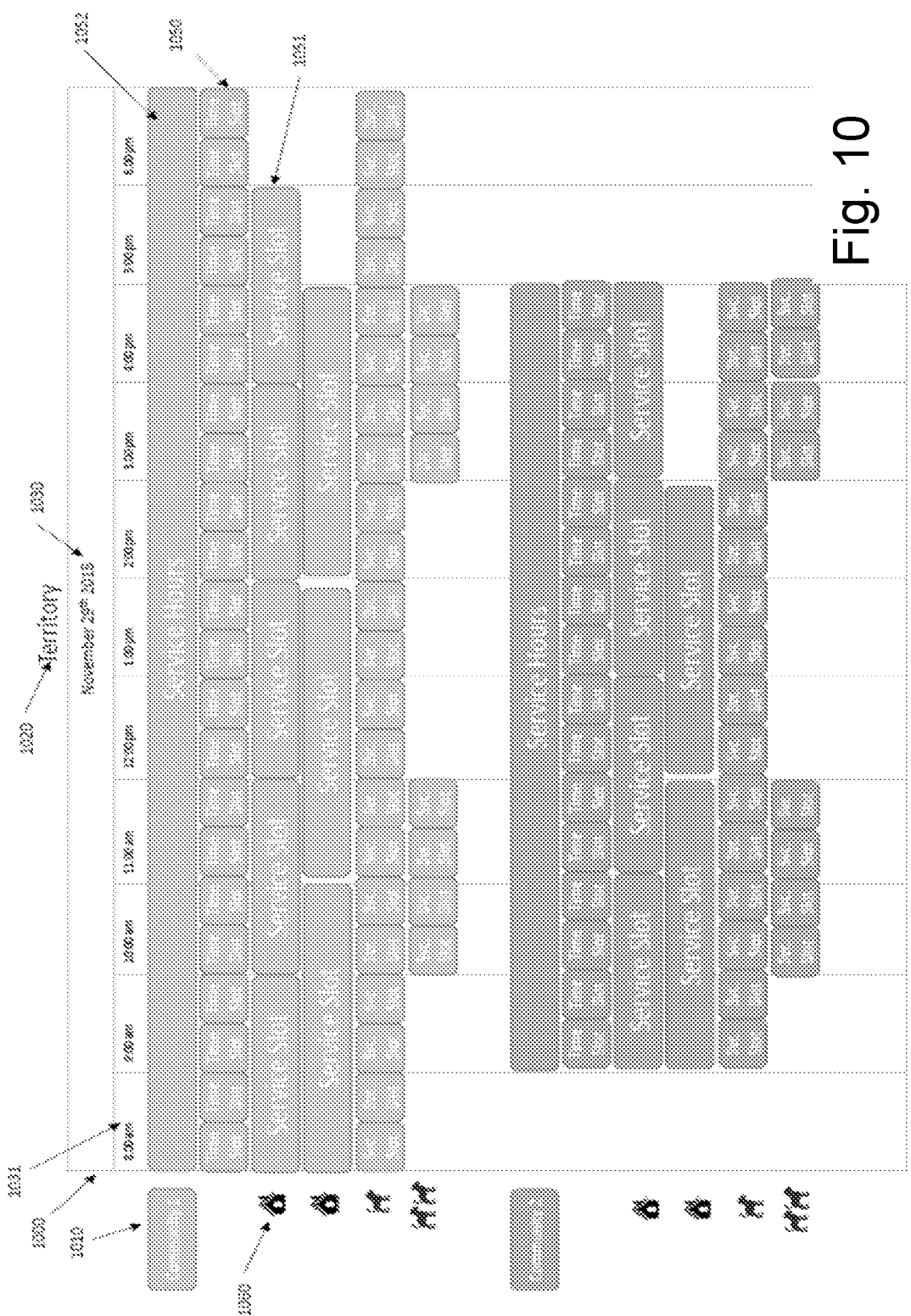
FIG. 10 shows a manager view of one embodiment of the invention.

Referring now to FIG. 10 there is provided a typical manager's view 1000 of the communities 1010 in their territory 1020 on a specific date 1030 displaying the service hours 1040 available at the specific community 1010 and the service slots 1050 currently committed by type of service 1060.

Figure 11:
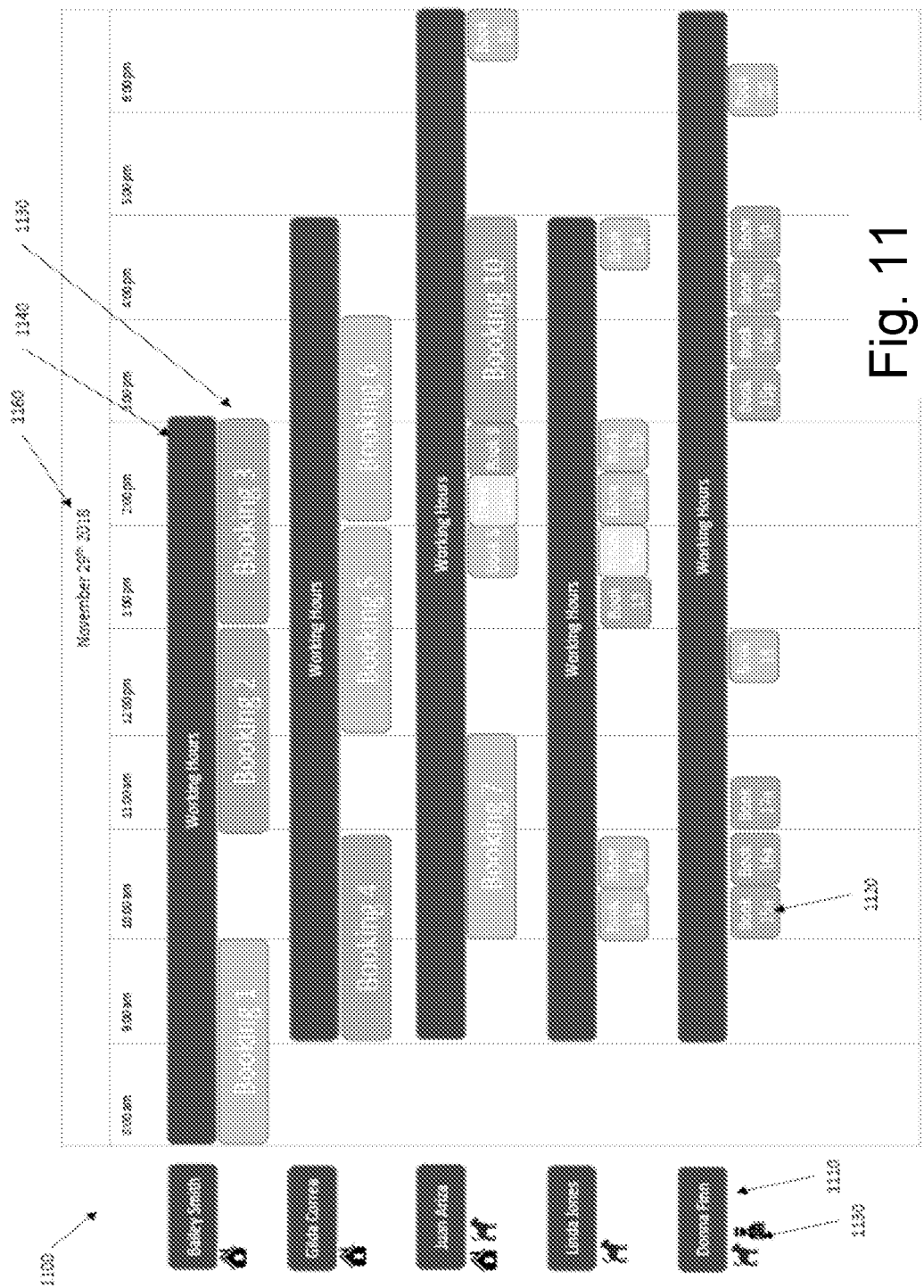
FIG. 11 shows another manager view of the embodiment shown in FIG. 10.

Referring now to FIG. 11 there is provided a manager view 1100 of the doorstep valet personnel 15 or home valet personnel 16 service providers 1110, the bookings times 1120 and the type of booking 1130 with respect to their scheduled working hours 1140 for the requested date 1160.

Figure 12:
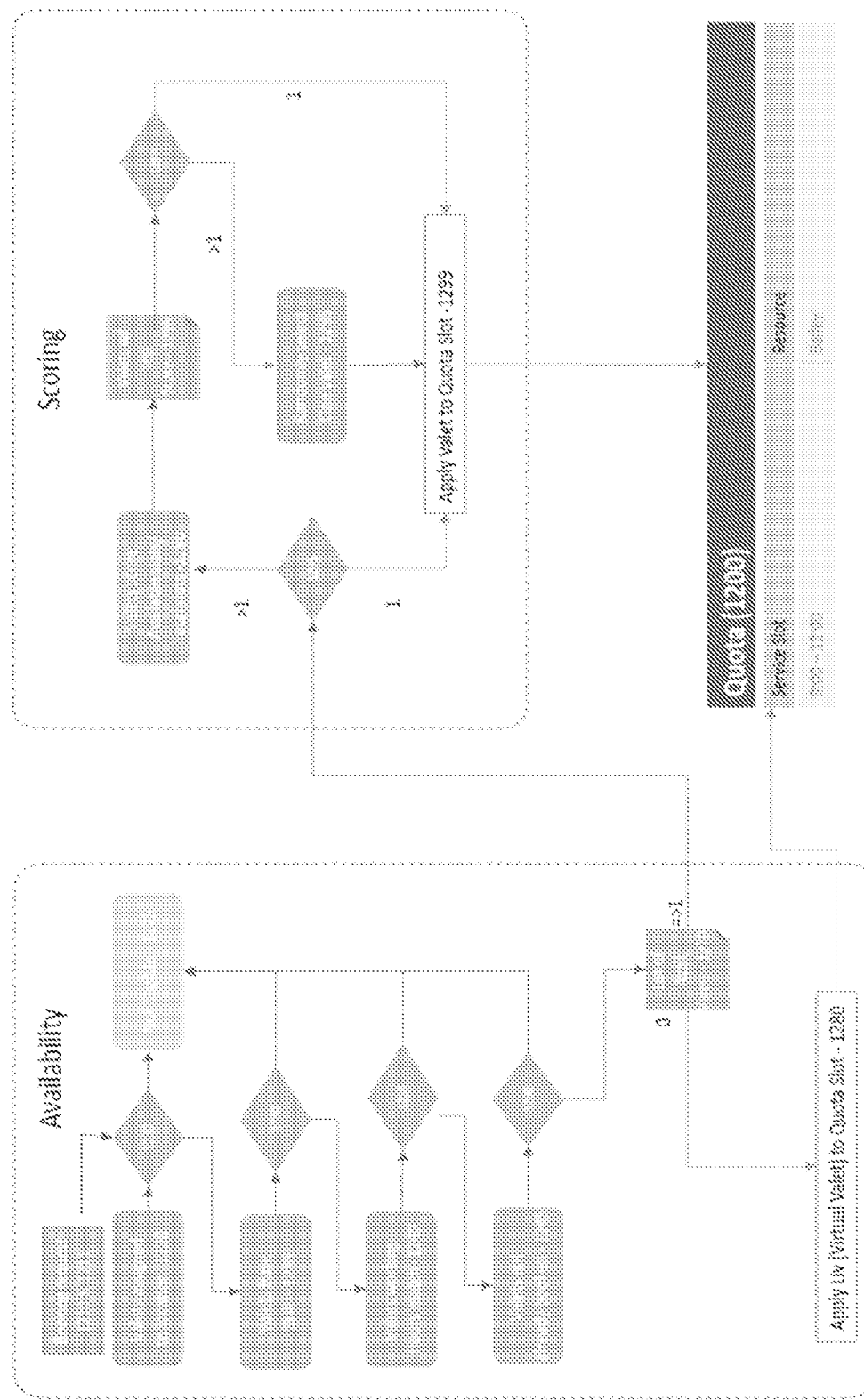
FIG. 12 is flowchart of how the Service providers are selected for the quota today.

Referring now to FIG. 12 there is shown a method for determining a quota 1200 for a doorstep valet personnel 15 or home valet personnel 16 service providers are selected for the Quota a specific day. The initial step required to find a suitable doorstep valet personnel 15 or home valet personnel 16 service provider is to use the booking request 1210 and booking time requested 1211. Step 1230 then determines if the property 35 or customer 20 is eligible for the service and has doorstep valet personnel 15 or home valet personnel 16 service providers available input is from steps 1210, 1211 and 1220. If none are available, the system returns not eligible for service 1275. If the property or customer are eligible and doorstep valet personnel 15 or home valet personnel 16 service providers are available step 1230 then the system determines if the doorstep valet personnel 15 or home valet personnel 16 service providers have the skills step 1235 to meet the booking request step 1210 at decision point step 1250. If they do not, then the system returns not eligible for service step 1275. If the available doorstep valet personnel 15 or home valet personnel 16 service providers have the skills the system looks at the doorstep valet personnel 15 or home valet personnel 16 service provider working hours step 1240 and determines if there is a match at decision point step 1255. If no match is found, the system returns not eligible for service step 1275. If the available doorstep valet personnel 15 or home valet personnel 16 service providers have the skills and are working during the booking time requested step 1211, then the system determines if they are already booked during that time at decision point step 1260. If they are already booked, the system returns not eligible for service step 1275. If there are available doorstep valet personnel 15 or home valet personnel 16 service providers, the system creates a list of doorstep valet personnel 15 or home valet personnel 16 service providers available step 1270. If there are no doorstep valet personnel 15 or home valet personnel 16 service providers available, a virtual doorstep valet personnel 15 or home valet personnel 16 service provider is assigned step 1280 and displayed to the Quota list step 1200. If the system has at least one doorstep valet personnel 15 or home valet personnel 16 service provider available, the system scores the doorstep valet personnel 15 or home valet personnel 16 service providers step 1295. If there are more than one doorstep valet personnel 15 or home valet personnel 16 service provider available, the system returns the doorstep valet personnel 15 or home valet personnel 16 service providers scores step 1290 and sorts the list by top score step 1296. Then the system determines the number of qualified and available doorstep valet personnel 15 or home valet personnel 16 service providers. If there is only one available doorstep valet personnel 15 or home valet personnel 16 service provider, it is assigned at the decision point step 1297 to the request for service/assignment 1 step 1299 and lists it on Quota step 1200. If there are more than one available doorstep valet personnel 15 or home valet personnel 16 service provider, the system randomly selects a doorstep valet personnel 15 or home valet personnel 16 service provider step 1298 and assigns to the request for service/assignment 1 step 1299 and lists it on Quota step 1200.

Figure 13:
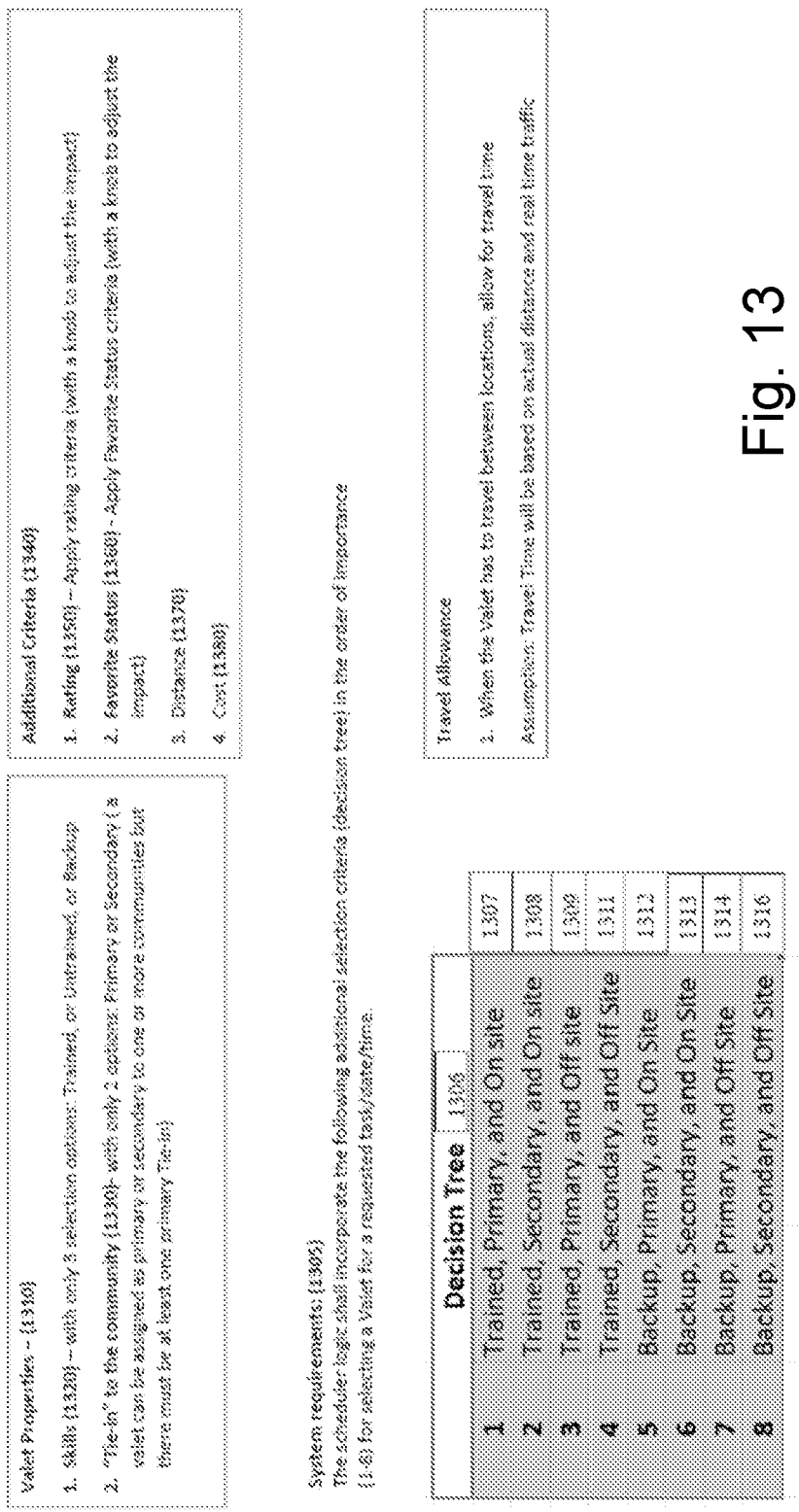
FIG. 13 shows the Multi-Site Scheduling Requirements as included in one embodiment of the invention.

Referring now to FIG. 13 there is provided the Multi-Site Scheduling Requirements. Doorstep valet personnel 15 or home valet personnel 16 service providers properties step 1310 include the doorstep valet personnel 15 or home valet personnel 16 service providers. Skills step 1320 has multiple selection options: Master which is a highly skilled and trained individual, or Untrained and individual who is not trained in that service, Apprentice is an individual who is in the process of training in the skills need for a particular service, they are in the process of being trained or has not completed the training yet, or Backup, an individual who has the required training. Service providers properties also include the service providers "Tie-in" step 1330 to the community has only 2 options: Primary or Secondary. A doorstep valet personnel 15 or home valet personnel 16 service provider can be assigned as primary or secondary to one or more communities but there must be at least one primary Tie-in. The service providers properties can also be enhanced by additional criteria step 1340 which include Rating step 1350—Apply rating criteria with a knob to adjust the impact, Favorite Status step 1360—Apply Favorite Status criteria with a knob to adjust the impact, Distance step 1370 to property and cost step 1380. The system can also apply a Travel Allowance step 1390, when the Valet has to travel between locations, thereby allowing for travel time. The basic travel time assumption is that travel time will equal one time slot or 30 minutes.

The System requirements step 1305 for the scheduler logic incorporates the following additional selection criteria, i.e., decision tree 1306, in the order of importance which is rate from 1 to 8 for selecting a doorstep valet personnel 15 or home valet personnel 16 service provider for a requested task/date/time using steps 1307, 1308, 1309, 1311, 1312, 1313, 1314, 1316.

Referring now to FIG. 14 there is provided the method for the scheduling service. The scheduling software 50 allows for accommodation of doorstep valet personnel 15 or home valet personnel 16 service provider selection by the request for service/assignment 1 of Skill Mastery Levels 1410 which are rated as Level 3—Trained/Master/High 1411, Level 2—Backup/Apprentice/Medium 1412 and Level 1—Untrained/Trainee/Low 1413. It also provides for location request for service/assignment 1 priority 1420 where Level 2 1421 is a primary location and Level 1 1422 is a backup or secondary location that the doorstep valet personnel 15 or home valet personnel 16 service provider can provide service to. The system also has the ability for the manager to assign onsite/off site priority 1430. If during scheduling, the service provider scheduling software sees that the doorstep valet personnel 15 or home valet personnel 16 service provider is onsite they will be assigned a booking as a priority if they have the time slot available. If the doorstep valet personnel 15 or home valet personnel 16 service provider is not at the site, then the system applies travel time to the request for service/assignment 1. The system also has the ability to factor in Utilization 1440 and travel time 1450 into the selection criteria.

Figure 15:
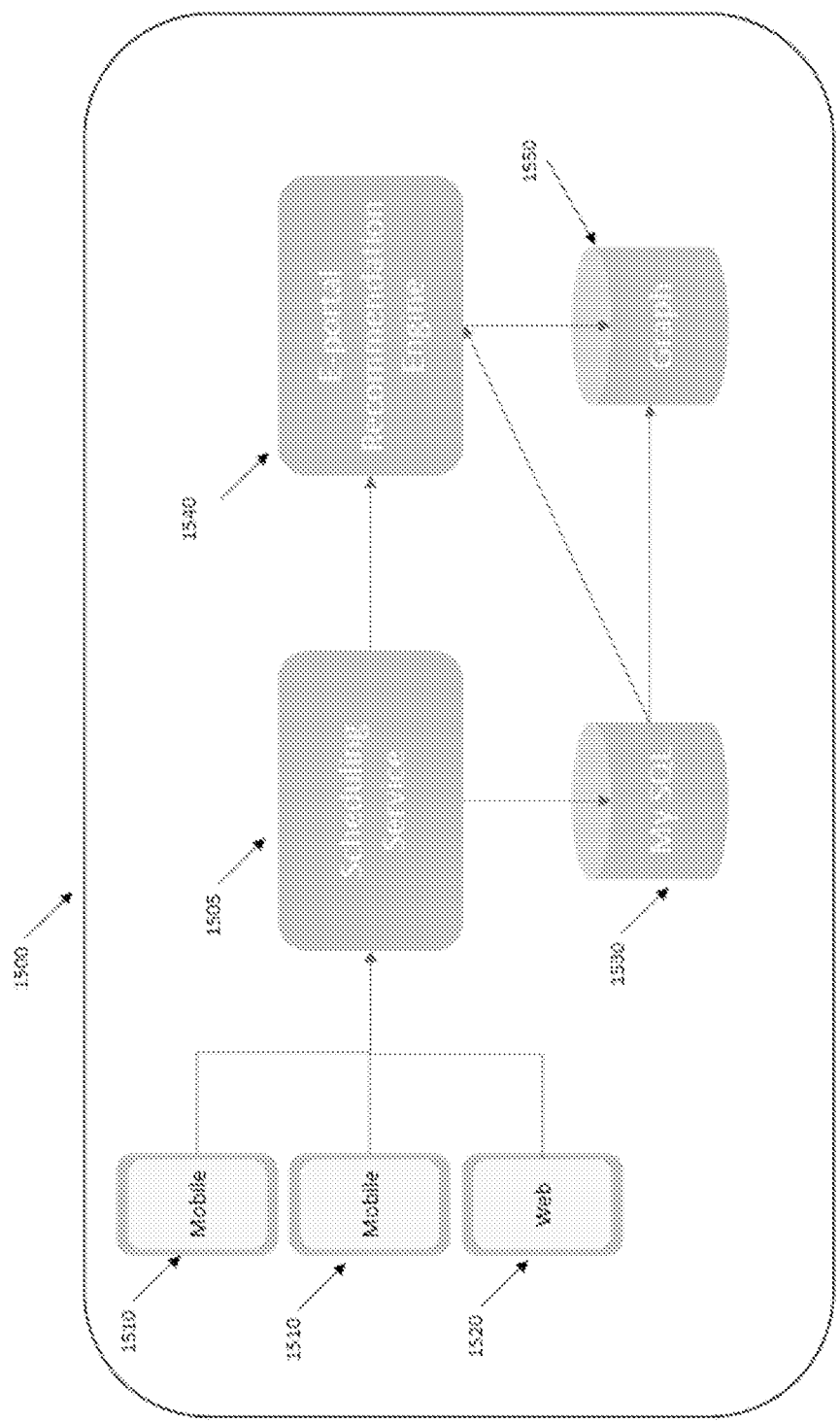
FIG. 15 shows the basic architecture of the scheduling portal as used in one embodiment of the invention.

Referring now to FIG. 15 there is provided the basic architecture for the scheduling portal 1500. The scheduling service 1505 is capable of communicating with the customer and with electronic communication device such as client mobile 1510 and web 1520 enabled devices. The SQL database 1530 and E-portal recommendation engine 1540 creates the list of available doorstep valet personnel 15 or home valet personnel 16 service providers for the scheduling service. The graphing software 1550 provides management graphs for the monitoring of territories, regions, properties, services/booking request and doorstep valet personnel 15 or home valet personnel 16 service providers.

Figure 16:
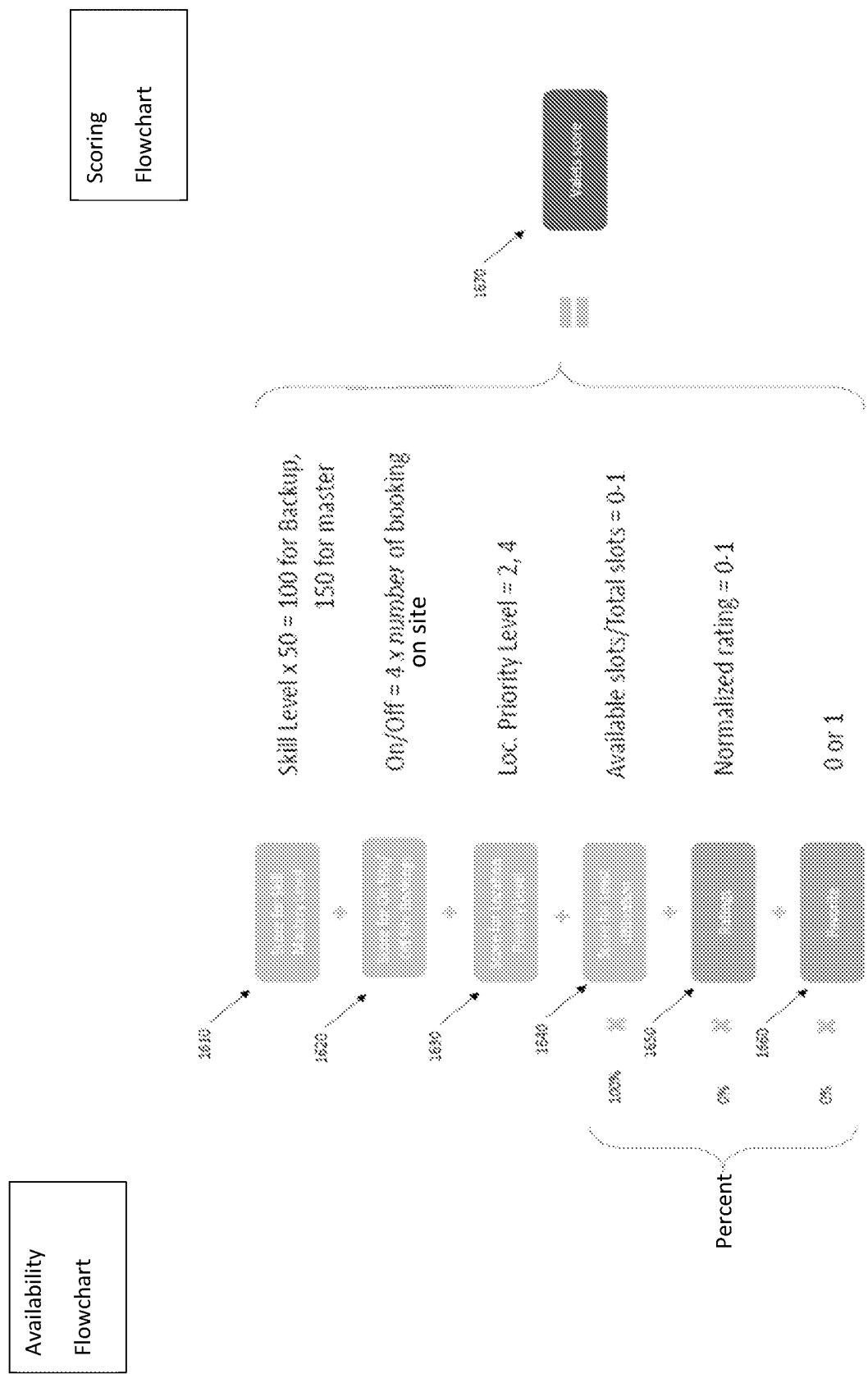
FIG. 16 shows one form of the logic for Quota Scoring Process as used in one embodiment of the invention.

Referring now to FIG. 16 there is provided the details of the Quota Scoring Process to determine a doorstep valet personnel 15 or home valet personnel 16 service provider score. The process sums the Skill mastery level 1610, the Score for onsite/offsite booking 1620, the score for the location level 1630, the score for utilization 1640, the doorstep valet personnel 15 or home valet personnel 16 service provider ratings 1650 and a score for favorite rating 1660 resulting in a doorstep valet personnel 15 or home valet personnel 16 service provider score 1670.

Figure 17:
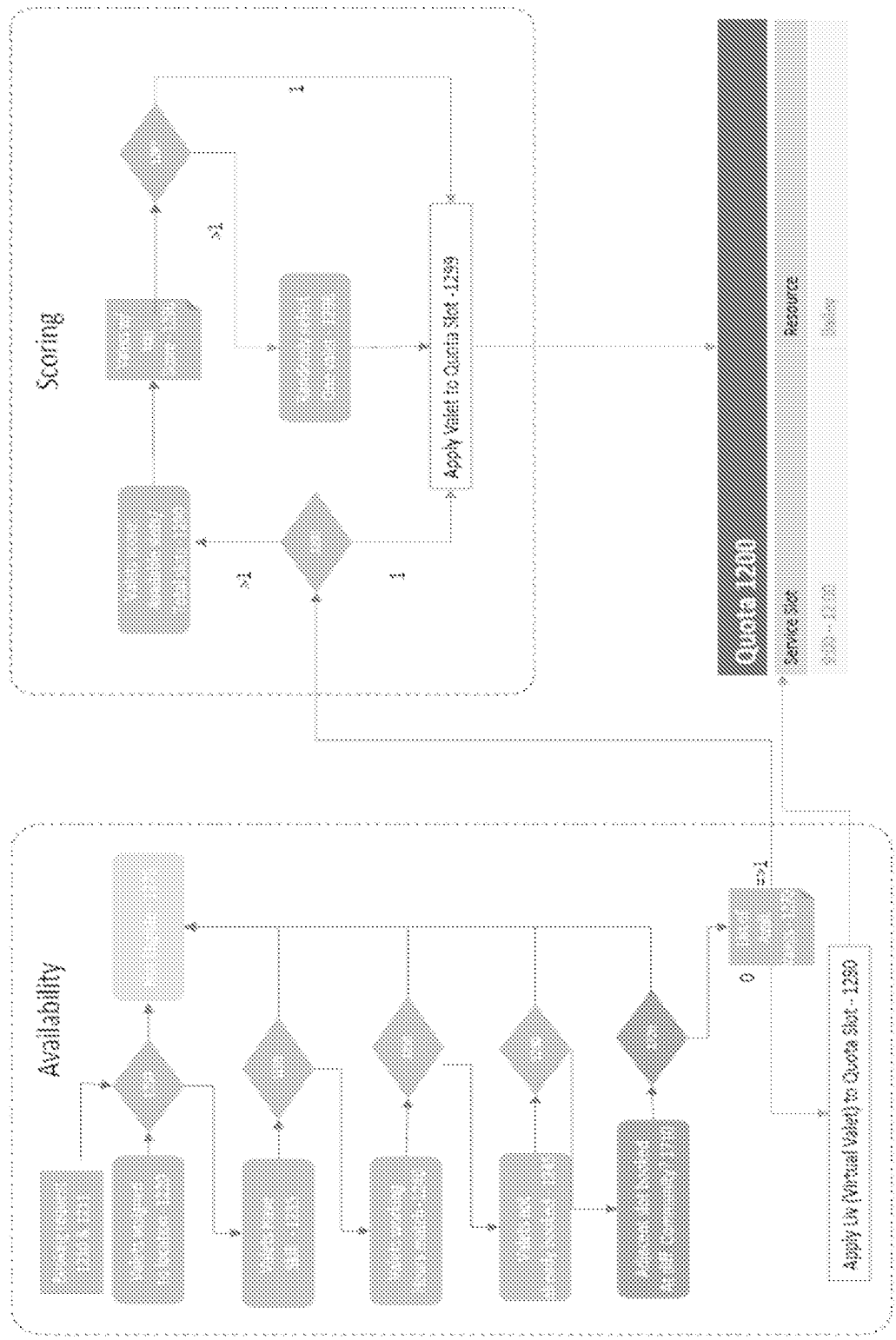
FIG. 17 shows one form of the logic for and alternate service provider selected for the Quota for a specific date as used in one embodiment of the invention.

Referring now to FIG. 17 there is provided the logic for an alternate doorstep valet personnel 15 or home valet personnel 16 service provider selected for the Quota for a specific date. The initial step required to find a suitable doorstep valet personnel 15 or home valet personnel 16 service provider is to use the booking request step 1210 and booking time requested step 1211. Step 1230 then determines if the property or customer is eligible for the service and has doorstep valet personnel 15 or home valet personnel 16 service providers available step 1220. If none are available, the system returns not eligible for service step 1275. If the property 35 or customer 20 is eligible and doorstep valet personnel 15 or home valet personnel 16 service providers are available, in step 1230 the system then determines if the doorstep valet personnel 15 or home valet personnel 16 service providers have the skills provided for in step 1235 to meet the booking request step 1210 at decision point step 1250. If they do not, then the system returns not eligible for service step 1275. If the available doorstep valet personnel 15 or home valet personnel 16 service providers have the skills, the system then looks at the doorstep valet personnel 15 or home valet personnel 16 service provider working hours in step 1240 and determines if there is a match at decision point step 1255. If not, the system returns not eligible for service step 1275. If the available doorstep valet personnel 15 or home valet personnel 16 service providers have the skills and are working during the booking time requested step 1211, the system determines if they are already booked during that time at decision point step 1260. If they are booked, the system returns not eligible for service step 1275. The system then evaluates adjacent booking timeslots at a different community step 1710 at decision point step 1720. If there are available doorstep valet personnel 15 or home valet personnel 16 service providers, the system creates a list of doorstep valet personnel 15 or home valet personnel 16 service providers available 1270. If there are no doorstep valet personnel 15 or home valet personnel 16 service providers available, a virtual doorstep valet personnel 15 or home valet personnel 16 service provider is assigned step 1280 and displayed to the Quota list step 1200. If the system has at least one doorstep valet personnel 15 or home valet personnel 16 service provider available, then the system scores the doorstep valet personnel 15 or home valet personnel 16 service providers in step 1295. If there are more than one doorstep valet personnel 15 or home valet personnel 16 service provider available, the system returns the doorstep valet personnel 15 or home valet personnel 16 service providers scores in step 1290 and sorts the list by top score step 1296. The system then determines the number of qualified and available doorstep valet personnel 15 or home valet personnel 16 service providers. If there is only one, it is assigned at the decision point step 1297 to the request for service/assignment 1 in step 1299 and listed on Quota step 1200. If there are more than one available doorstep valet personnel 15 or home valet personnel 16 service provider, the system randomly selects a doorstep valet personnel 15 or home valet personnel 16 service provider step 1298 and assigns it to the request for service/assignment 1 in step 1299 and lists it on Quota in step 1200.

Figure 18:
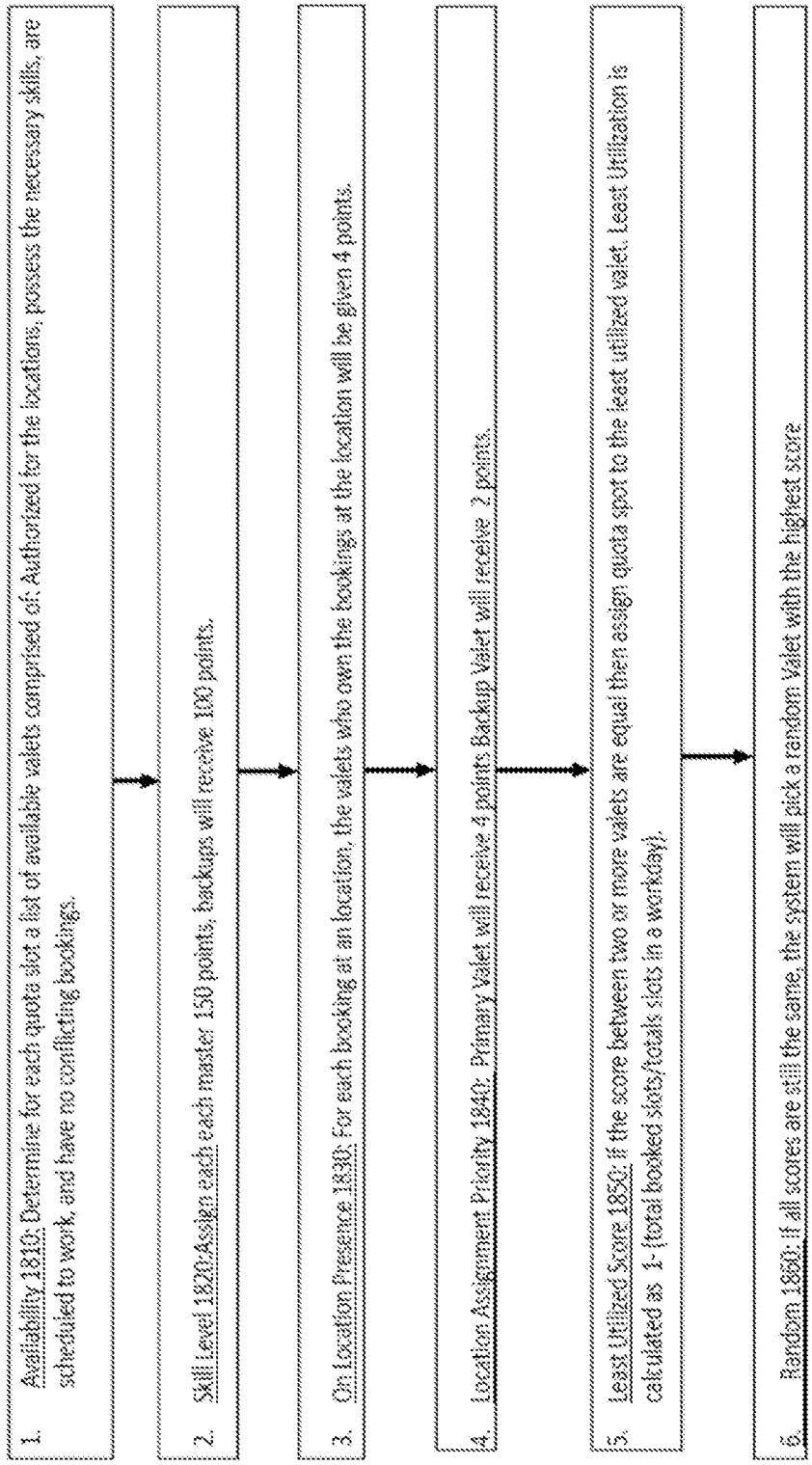
FIG. 18 shows one form of the scoring algorithm used to select a service provider as used in one embodiment of the invention.

Referring now to FIG. 18 there is provided detail as to the scoring algorithm used to select a doorstep valet personnel 15 or home valet personnel 16 service provider. Using the scoring outcome logic, the scoring system will select the candidate for each slot in the quota based on the following logic.

Availability step 1810, for each quota slot, the system will first select a list of available valets, including those who can serve the locations, have the necessary skills, work on the booking date, and have no conflicting bookings. Skill Level 1820, based on skill level, each master will receive 150 points, while backups will receive 100 points On Location Presence 1830, for each booking at the requested location, the valets who own the bookings will be given 4 points. Hence, the more bookings one has at the location, the higher the score.

Location Presence Request 1830 for service/assignment 1 Priority, valet will receive 4 points if they are a primary employee for the requested location and 2 points if they are a backup. Those who are assigned as primary will be selected for the quota over the backup only if there is an even number of bookings between 2 valets.

Location Assignment Priority 1840: Valet will receive 4 points if they are a primary employee for the requested location and 2 points if they are a backup. Those who are assigned as primary will be selected for the quota over the backup only if there is an even number of bookings between 2 valets.

Least Utilized Score 1850, in the event all previous criteria yields an even score between two or more valets, the system will look to assign the quota spot to the least utilized valet. Least Utilization is calculated as 1 minus the total booked timeslots/totals timeslots in a workday. This calculation is mainly used to understand when certain valets with the same score have bookings at other locations, so the Least Utilized Score will promote a request for service/assignment 1 to an un-booked valet to get the first order at a location that no one else already serves.

Random 1860, if all scores are still the same, the system will pick a random Valet with the highest score.

Figure 19:
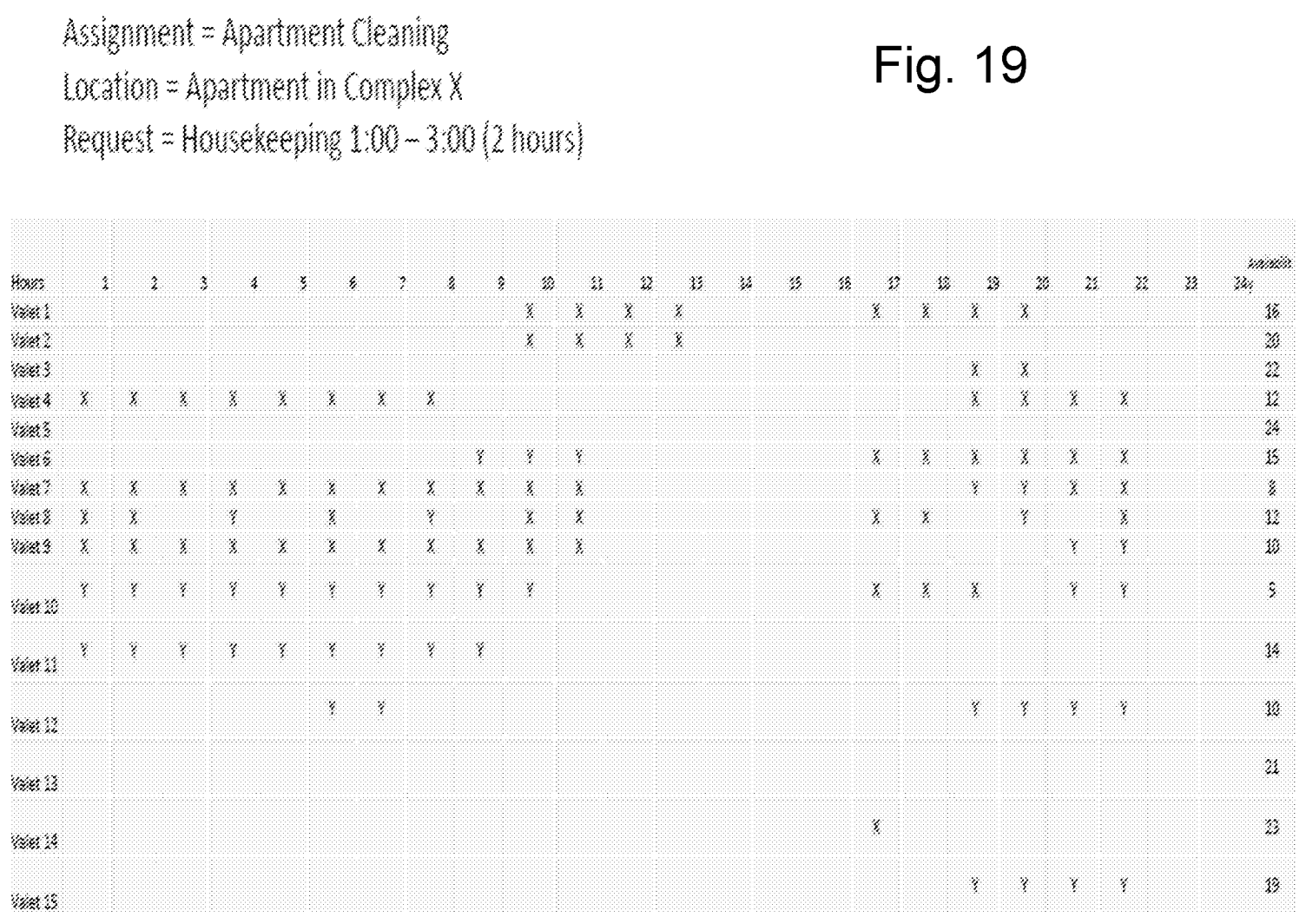

Referring now to FIG. 19 there is provided an example of a chart created by the on-site and offsite scoring logic method. Using the chart, there are 15 possible doorstep valet personnel 15 or home valet personnel 16 service providers that could perform the request for service/assignment 1.

Referring now to FIG. 20 there is provided the results of the analysis for on-site and off-site logic method using the 15 possible valets from FIG. 19.

Looking now at FIG. 20 which demonstrates that first the scheduling service 1505 identifies the doorstep valet personnel 15 or home valet personnel 16 service providers that are available during the time the service is requested. If there are no doorstep valet personnel 15 or home valet personnel 16 service providers available, the algorithm will respond to the customer with available times when doorstep valet personnel 15 or home valet personnel 16 service providers are available. If there are times when there are doorstep valet personnel 15 or home valet personnel 16 service providers available, the algorithm will rank each doorstep valet personnel 15 or home valet personnel 16 service provider by skill level. Skill levels are set at level 1, 2 or 3 with 3 being expert. The algorithm is then multiplied by 50 resulting in a skill level of 50, 100 or 150 which is the Skill Rating in column AG. This is done to force the selection algorithm to select the most qualified doorstep valet personnel 15 or home valet personnel 16 service provider. The algorithm then calculates the number of existing requests for service/assignment 1 at the specific site that the doorstep valet personnel 15 or home valet personnel 16 service provider has at the specific site which is the number of requests for service/assignment 1 locations multiplied by column AG. The algorithm then calculates an onsite rating which is the number of requests for service/assignment 1 multiplied by 4 which is the Onsite Rating in column AI. The algorithm then assigns a location value which signifies if the location is a primary or secondary service site for the provider. The algorithm then assigns a 4 for primary and a 2 for secondary which is the Location Rating in column AJ. The algorithm then calculates the total available timeslots which the doorstep valet personnel 15 or home valet personnel 16 service provider may provide the required service at the specific site and then calculates the availability score. The availability score is the available timeslots divided by 24, i.e. available number of hours, which is the Availability Score in column AL. The algorithm then calculates the sum of Skill Rating in column AG Onsite Rating in column AI, Location Rating in column AJ, and Availability Score in column AL. The doorstep valet personnel 15 or home valet personnel 16 service provider with the highest score is the doorstep valet personnel 15 or home valet personnel 16 service provider recommended for the request for service/assignment 1.

For example, referring to valet 15, 16 shown in FIG. 20, which looks at valets in properties X and property Y the algorithm would calculate a Score of 222.21 which is the highest recommendation value score. The score is calculated as follows Score=Skill Level+On Site Rating+Location Rating+Availability. Therefore, the score is the sum of Skill Rating (AG)=150, plus Onsite Rating (AI)=68 plus Location Rating (AJ)=4 plus Availability Score (AL)=0.21 for a total Score (AM) of 222.21. Based on this, the valet 15, 16 would be the doorstep valet personnel 15 or home valet personnel 16 service provider recommended first to the customer. The system would then retrace the order until the customer selects a doorstep valet personnel 15 or home valet personnel 16 service provider.

The system using the scheduling software and the integrated access management system provides the schedule to the doorstep valet personnel 15 or home valet personnel 16 service provider and access control information. The scheduling system alerts the customer that standard cleaning will occur during the specific times and that they should be prepared for the doorstep valet personnel 15 or home valet personnel 16 service provider, so they can complete the request for service/assignment 1. The system is capable of integrating a number of different lock systems which all provide specificity of access time by pass lock control information or pass code to the doorstep valet personnel 15 or home valet personnel 16 service provider/valet which provides them access to the specific property only at the time they are scheduled to provide the service. For example, if a property has an access control system that controls the main doors to the elevator lobby or allows onsite entrance defined as the main lock and then individual apartment door locks for the specific apartment defined as the apartment lock then the doorstep valet personnel 15 or home valet personnel 16 service provider will be provided the access information for the main lock and then the access information for the specific apartment lock.

An embodiment of the invention includes a system 10 that creates an account directly with an e-lock software application. Customer 20 at the community grant semi-permanent scheduled e-keys to the specified system 10 account within the Access management system 2100.

Customers 20 book services within the system 10 and select "Home Access Granted"

The valet personnel 15 or home valet personnel 16 service provider reviews orders and validates that an access control information was provided and then valet personnel 15 or home valet personnel 16 is provided access. An embodiment of the invention is designed to work with lock systems and software currently known in the market and has the capability to add lock systems and software as new products are introduced to the market. Present systems available include many Radio frequency and non-radio frequency lock systems including but not limited to DKS Door king systems, Delphian Systems, Lockitron® Bolt which has Wi/FI and Bluetooth® connectivity including remote access and share access with multiple people. Kisi which monitors access logs, shares keys with employees and unlocks the door remotely. Latch® which provides door access, automated deliveries and access sharing for residents and easy management for property managers. Point Central which is an enterprise scale tool for property managers allowing one person to manage thousands of homes. Resort Lock which eliminates the issues with managing keys and early and late checkouts. OLA which has Bluetooth and finger print access capability. Westinghouse Nucli® which has WI/FI and finger print recognition, camera, voice mail and real time voice communication. Smartphone-based ACaaS platforms such as August smart Lock®, HID®, Brivo API, Nuki, August® smart Lock Pro 3rd Generation, Kwikset® Kevo, Kwikset Kevo Convert, Kwikset Premis, Lockitron® Bolt, Lock-State® RemoteLock, Schlage Connect, Schlage® Sense, Sesame Smart Lock, Ultraloq® UL3 BT and Yale® Assure Lock. Amazon® Lock API and Kisi platform. Apple® HomeKit with Schlage Sense, August Smart Lock Pro, Amazon Alexa® with Kwikset Kevo, August Smart Lock Pro, Samsung® SmartThings Budget: Kwickset 910, Schlage Connect, iTunes with August Smart lock sets, DKS Doorking systems and Google® Play Kwikset Kevo. All provide locks which are compatible.

An embodiment of the invention is designed to work with lock systems having integrated camera locks and software currently known in the market and has the capability to add lock systems with integrated camera locks and software as new products are introduced to the market. Present systems available included with integrated camera locks, bare Gate Smart Lock has Wi/Fi connectivity and two-way audio and video streaming. Built specially for the lock and August Doorbell Cam has HD video with night infrared and two-way audio.

Figure 21:
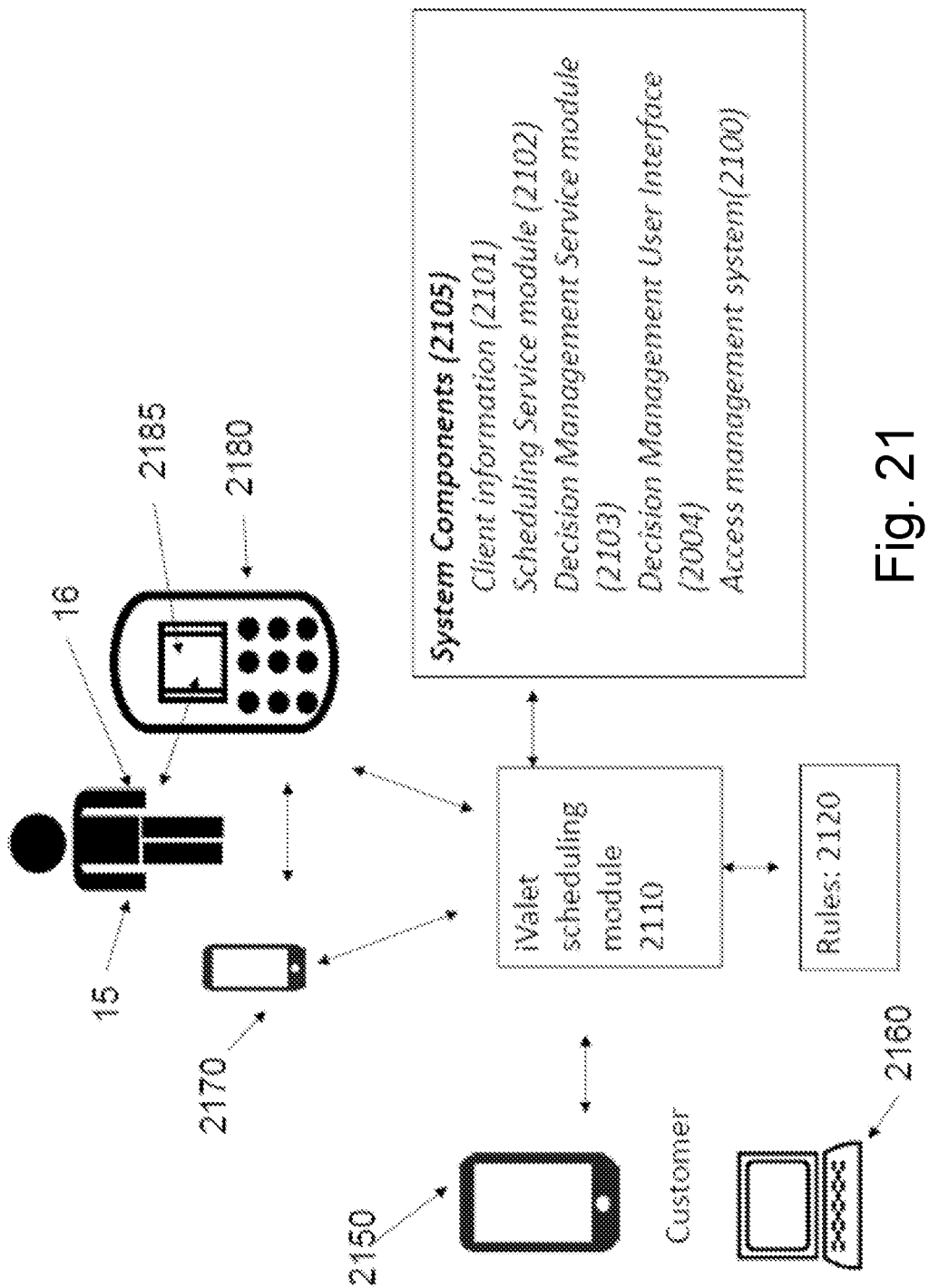
FIG. 21 shows one method of an embodiment of the invention.

Referring now to FIG. 21, the access management system is shown. Access management system 2100 is part of the Scheduling module 2105 that communicates with the scheduling module 2110 which communicated with the rule module 2120 and the customer using either smart phone 2150 or computer 2160. Once the doorstep valet personnel 15 or home valet personnel 16 service provider and the service time has been confirmed, the scheduling module communicates with the access module system 2100 and is issued the necessary access information depending on the location and lock configurations. The access management system can provide either a token to the doorstep valet personnel 15 or home valet personnel 16 service provider electronic communication device such as smart phone 2170 or it could provide biometric data to the lock 2180 which would be scanned by biometric reader 2185. Once the information is confirmed at the lock site, the lock can also send the information back to the scheduling module which confirms the security information with the access management system which returns the signal to the scheduling module and unlocks the door allowing the doorstep valet personnel 15 or home valet personnel 16 service provider access to the apartment.

As noted, the resident lock system from any of the suppliers of hardware and software provides the specific lock with either a unique token or biometric identification information to the locking device and limits the use of the information to open the lock for the specific doorstep valet personnel 15 or home valet personnel 16 service provider only during the specified times. The necessary token, either hardware or biometric identification process can be seen in FIG. 21.

The communication module used to communicate with the doorstep valet personnel 15 or home valet personnel 16 service provider, wherein the processing system 26 and 36 may have a server 25 and 37 using an electronic communication method 1700 to communicate with customer electronic communication devices such as tablet/smart phone 70 and application 41, client electronic communication devices such as tablet/smart phone 43 or PC 42 and application 41, service provider electronic communication devices such as tablet/smart phone 60 and application 61, manager electronic communication devices tablet/smart phone 80 and application 81 and the service provider electronic communication devices such as tablet/smart phone 60 and application 61 is in communication with a geo fence 1600.

The electronic communication method 1700 can be selected from the group consisting of TCP/IP, Wi/FI, Zigbee®, Z-Wave®, Bluetooth®, XHTML® Basic, Nokia's XHTML Mobile Profile, and WAP by the Open Mobile Alliance.

Referring now to FIG. 21, the access management system is shown. Access management system 2100 is part of the scheduling module 2110 that communicates with the scheduling module 2110 which communicates with the rule module 2120 and the customer using either smart phone 2150 or computer 2160. Once the doorstep valet personnel 15 or home valet personnel 16 service provider 2190 and the service time has been confirmed, the scheduling module communicates with the access module system 2100 and is issued the necessary access information depending on the location and lock configurations. The access management system can provide either a token to the doorstep valet personnel 15 or home valet personnel 16 service provider smart phone 2170 or it could provide biometric data to the lock 2180 which would be scanned by biometric reader 2185. Once the information is confirmed at the lock site, the lock can also send the information back to the scheduling module which confirms the security information with the Access management system which returns the signal to the scheduling module and unlocks the door allowing the doorstep valet personnel 15 or home valet personnel 16 service provider access to the apartment.

Expanding on the use with respect to doorstep trash collection which may include software for use with an electronic communication device such as a laptop or mobile device to provide management and communication of residential trash and recycling management. The system includes a customer/client interface and software for the resident to enter information about their trash collection needs which is communicated to a customer/client interface and software that a service provider uses to collect their waste.

An embodiment of the invention provides the enhancement of directed collection, which reduces labor and improves safety by shortening the time that trash is placed out for collection. In addition, the service provider mobile software tracks the location of the service provider using geo position technology and positional beacons. This enables communication to the resident of the approximate time of collection specific to their home. Communication can be provided to residents/customers through the mobile application, phone notification capabilities, SMS messaging, or email. The integrated solution includes functionality to capture service quality observations using photographic evidence such as service violations and safety issues. It may be integrated with a building management system to enable reporting and compliance management. It includes a web-based portal for the service provider management and residential property management to schedule service, review reporting, and manage quality.

The current technologies workers proceed through the property collecting from buildings in a path without any direction other than "nearest" next door. They collect from a building making trips back to the truck and then when the truck is full, they drive back to the compactor to empty it. There are multiple issues with this process.

First, they make several trips over the same path because their tote will fill up before clearing a section.

Second, the truck may fill up requiring a trip to the compactor before a building is clear.

A third issue which is contributed by the first two issues is that they have no way to track where they left off in each trip. The current technology the geo-fence is limited to the outside of the building, so they are prone to missing units when they don't go back and start from exactly the same place that they left off.

Figure 22:
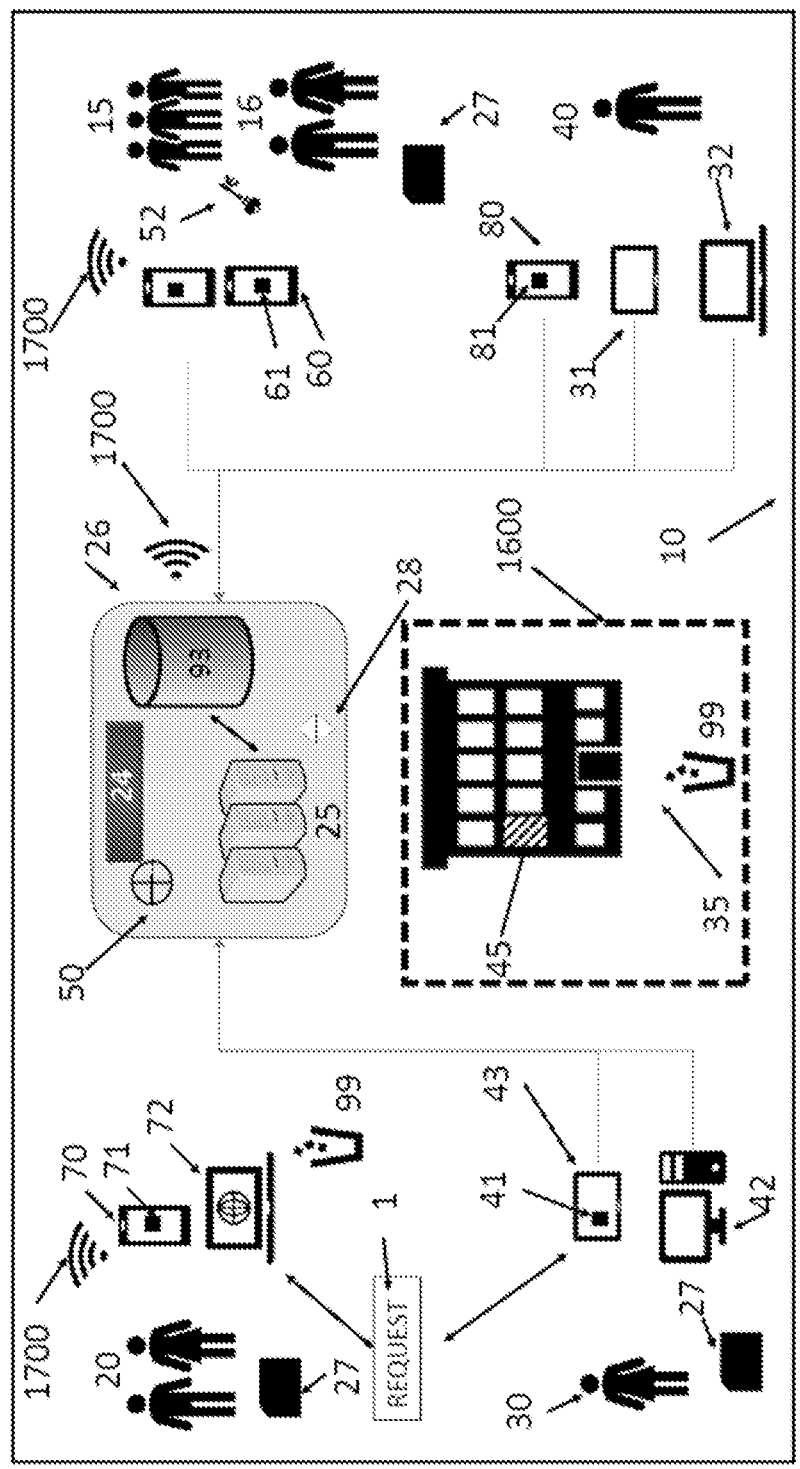
FIG. 22 shows one method of an embodiment of the invention.

An embodiment of the invention trash collection feature entails the ability for residents to provide feedback to processing system 26 at any time outside the "Service Window" and "Set Out Window." During the Service Window, the resident will be reminded that it is time to put their trash out. During the Set-Out window, they will be given a last chance to still put their trash out until (before) the Valet/service provider has Clocked out and inform processing system 26 of their action Referring to FIG. 22, FIG. 23 the processing system 26 using the scheduling software 50 and the integrated access management system 28 which has access to the system database, which is part of the processing system 26, provides the schedule to the doorstep valet personnel 15 service provider and access control information 52. The doorstep valet personnel 15 service provider is connected to the part of the processing system 26 and scheduling software 50 by way of their smart phone 60 using application 61. They are provided a route for collection based on the information as to the customers have uploaded as to setting out the waste container service 99. The geo fence 1600 and service provider route algorithm generator 91 allow the doorstep valet personnel 15 or home valet personnel 16 to efficiently collect trash that is placed for removal and minimizes the window when trash is placed out for pickup. The service provider route algorithm generator 91 transfers the route to the doorstep valet personnel 15 or home valet personnel 16 smart phone 60 and smart phone 60 is in communication with geo fence 1600 which monitors the doorstep valet personnel 15 or home valet personnel 16 using their cell phone 60 and application 61. It then provides the service provider route algorithm generator 91 information with respect to location of doorstep valet personnel 15 or home valet personnel 16 and the smart waste container 3011 which has been picked up according to waste container service 99 and service provider route algorithm generator 91 and the smart waste container 3011 that still need to be picked up. The RFID tag 3000 may be applied such that it records the action of opening and closing of the receptacle cover. The system 10 utilizes doorstep valet personnel 15 or home valet personnel 16 using their cell phone 60 and application 61 and the RFID reader 3010 which captures the presence and distance from the reader to the smart waste container 3011 and whether or not the container was opened.

The access control management system 28 provides a closed network with secure and reliable access control features. It allows an embodiment of the invention to authorize or revoke control for another user can be done instantly from anywhere. In the absence of cloud connectivity devices switch to direct communication.

No need for Wi-Fi routers and access points shared with other users, computers, TVs, and other peripheral devices. Particularly for high security access control purposes such as doors.

No need to worry about power outages that can keep you locked outside the house or bring down your monitoring and surveillance systems.

When the invention is viewed from the Internet of Things (IoT) perspective, an embodiment of the invention is conceived as an extensible IoT system solution, having firmware, software and cloud elements designed to interoperate, support end-to-end security, enable ease-of-use, and be mobile device friendly. An embodiment of the invention software defined attributes rapidly insuring compatibility across mobile device, embedded devices and the cloud. Compatibility is assured by standardizing on a common low power WAN based on the mature ANT stack from Dynastream and ubiquitous Bluetooth Low Energy (BLE) protocol enabled devices. Command and control of an embodiment of the invention enabled products is directly available through the mobile device application. An embodiment of the invention can be adapted to a wide range of apartment support applications due to the power and simplicity of the mobile device and network formed between the company managers 40, clients 30, customers 20 and doorstep valet personnel 15 or home valet personnel 16 service provider. Another embodiment of the invention allows for remote operation of the main door or the individual apartment doors. It turns any mobile and personal device into a secure global remote control. The access control management system 28 of an embodiment of the invention and the doorstep valet personnel 15 or home valet personnel 16 service provider smart phone 60 using application 61 becomes the universal controller for everything that allows remote control. This controller can be shared with other users of mobile and smart devices.

There is no need to carry or share keys, security codes, garage door or gate remote fobs, or disparate IR or RF controls for lights, or other devices. No need to re-key locks, re-program keypads, re-program RF remote control devices and no need to replace batteries frequently.

Locks and other remote devices which can be connected to the access control management system 28 and may be controlled by the doorstep valet personnel 15 or home valet personnel 16 service provider smart phone 60 using application 61 both directly and over the cloud. Powerful automation features give the company managers 40, clients 30, customers 20 and doorstep valet personnel 15 or home valet personnel 16 service provider more power to control smart devices.

An embodiment of the invention eliminates the need for connecting disparate hardware and software, and dealing with firewall settings, eliminates the need for "buzzing" doorstep valet personnel 15 or home valet personnel 16 service provider in since they can be authorized to use their own mobile device based on timeslots 1050.

An embodiment of the invention can be extended to provide access control for the customers individual apartment door looks. An embodiment of the invention can eliminate issues about doors left unlocked since they can lock/unlock automatically in the absence or presence of a user.

An embodiment of the invention can eliminate issues of letting family or visitor comings and goings, notifications come automatically to the customers 20 and allows the customers 20 to control the access.

Figure 23:
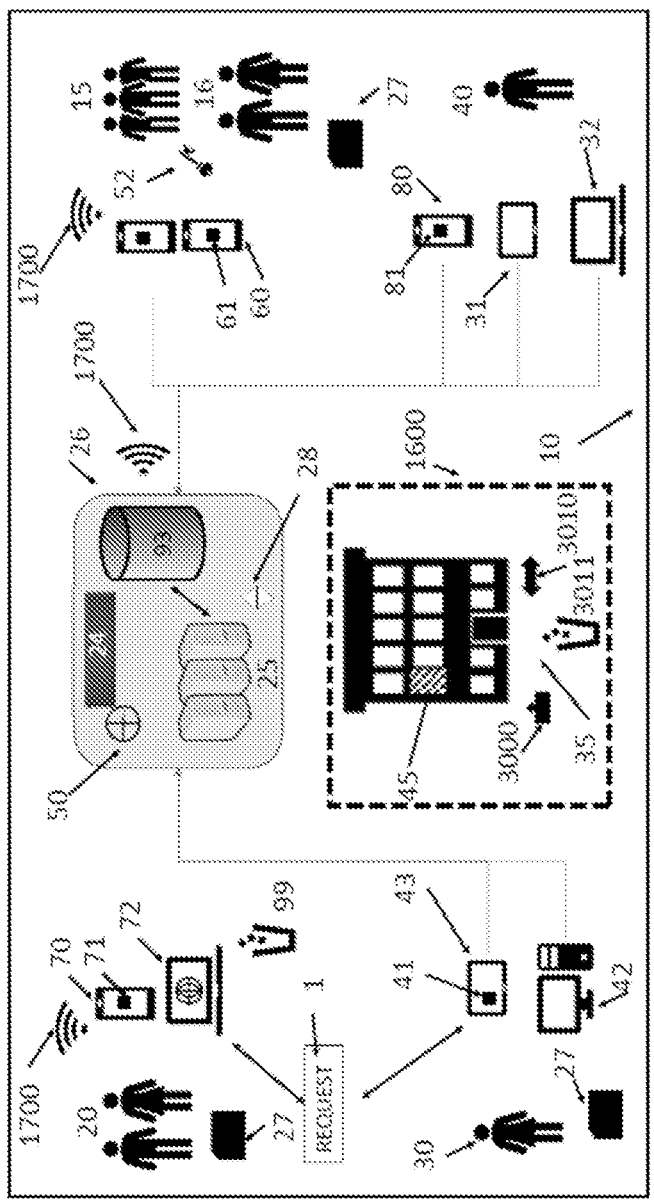
FIG. 23 shows a smart trash container integrated into the system.

Looking at FIG. 23 the system 10 is expanded to support wireless sensor technology which provides the ability to track the individual home level assuring that all trash is collected. The technology consists of a RFID tag 3000, which may or may not be powered, that is applied to the waste container service 99 used for collection which creates a smart waste container 3011. The waste container service 99 is then associated within system 10 to the specific apartment 45. The RFID tag 3000 may be applied such that it records the action of opening and closing of the receptacle cover. The system 10 utilizes an RFID reader 3010 that may be integrated into a smart phone 60 and is carried by the doorstep valet personnel 15 or home valet personnel 16 service provider. As the doorstep valet personnel 15 or home valet personnel 16 service provider passes apartment 45, the RFID reader 3010 captures the presence and distance from the reader to the smart waste container 3011 and whether or not the container was opened.

The information is transmitted wirelessly to the RFID reader 3010 which in turn communicates the information wirelessly to a processing system 26 and database 93. Multiple containers can be individually tracked, and the information can track trash waste separate from recycling.

RFID can be replaced by any suitable communication protocol such as but not limited to TCP/IP, Wi/FI, Zigbee, Z-Wave, Bluetooth, XHTML Basic, Nokia's XHTML Mobile Profile, and WAP by the Open Mobile Alliance.

The information can be used to provide service reporting that assures the trash is collected according to service level agreements. By comparing the distance to the smart waste container 3011 to the property configuration, it can be determined if each apartment has placed waste out for collection or not, how many smart waste containers 3011 were placed out, and whether recycling or trash containers were placed out.

In addition, by tracking at the unit level, an embodiment of the invention can track the exact location of the service resource, enhancing quality and safety. This enables communication directly to customer 20 when the doorstep valet personnel 15 or home valet personnel 16 service provider is nearing their home and when the waste has been collected.

This process enables reduced time for the smart waste container 3011 to be placed in common areas, which reduces both tripping and potential fire hazards. Finally, customer 20 behavior data can be analyzed to provide optimized routing of doorstep valet personnel 15 or home valet personnel 16 service provider resources, which reduces labor and associated service cost.

An embodiment of the invention is further enhanced when the RFID tag 3000 is a battery powered unit that provides a beacon that utilizes a Bluetooth radio frequency. This enables the system to read the beacon with a smartphone 60 without any additional equipment. In addition, there is motion detection capability that can be incorporated into the beacon.

By embedding/attaching this type of beacon to the lid 3012 of the smart waste can 3011, we can determine the distance between the doorstep valet personnel 15 or home valet personnel 16 service provider and the smart waste container 3011 and whether the lid 3012 of the smart waste container 3011 was moved. When the smart waste container 3011 is deployed, the system assigns each smart waste container 3011 and the associated beacon to a customer 20.

The system 10 determines on a nightly basis how close the doorstep valet personnel 15 or home valet personnel 16 service provider came to each can and whether the lid was moved. This data will be combined with the geo-fence data as well as beacons attached to the physical property 35 and customer 20 to build a profile of doorstep valet personnel 15 or home valet personnel 16 service provider passage through the building.

This data helps to determine: smart waste can 3011 that were placed out (proximity<1 m), smart waste can 3011 that were collected (proximity<1 m and lid movement), smart waste can 3011 that were not placed out (proximity>1 m when geo-fence/physical building attached beacons confirm the building was cleared), and can also provide an immediate alert when a can is passed without collecting (proximity<1 m and no lid movement).

In another embodiment of the invention, there is provided connectivity of information to a service manager, a service provider, a client, and a customer residing in a property. The property has at least one door and it has a property security system which manages the at least one door. In addition, the property security system communicates with the internet using an electronic communications device having its own specific address and the electron communication device using a communication protocol such as TCP/IP, Wi/FI. As is known all devices on the internet have their own specific address which the invention utilizes when sending and receiving information used in the system. As such, the system webserver can also communicate with the internet using a second electronic communications device having its own specific address.

The smart device used in the invention is capable of communicating with multiple devices such as a geo fence using a geo fence receiver which uses a communication protocol specific to the geo fence and with the internet electronic communications device having its own specific address and using a communication protocol for communicating on the internet and a smart trash can receiver which uses a communication protocol specific to the smart trashcan and receptacle cover. The webserver is enabled such that it can communicate access time slots, date and access control information to the internet and the information is directed to be received by a specific address.

In addition, the property security system communicates with the internet using an electronic communications device having its own specific address and uses an internet-based protocol and receives the access time slots, date and access control information from the internet using an electronic communications device having its own specific address and using a communication protocol. The access control information allows access to the property by a service provider using a smart device that has a service provider mobile application on a smart device.

Additionally, the system includes a webserver having a scheduler module having schedule information, a work queue management module having work queue information, an order management module having order management information, a fulfillment manager having order fulfillment information. a service provider module having service provider information, a task quota module having task quota information, a scheduling module having scheduling information, a communication module in communication with an electronic communication device having its own specific address capable of communication with the internet using a protocol, an administration module used to manage the service provider and the property using the system. Further the webserver has an access control module, with access control information for the property security system.

The smart device can also communicate with a smart trash can with a smart trash can receptacle cover which is capable of identifying the if the cover has been removed from the smart trash can. Both the smart trash can, and smart trash can receptacle cover use a protocol which can communicate with the smart device.

The electronic communication method protocol for the geo fence, smart can, smart can receptacle cover and can be selected from the group consisting of TCP/IP, Wi/FI, Zigbee®, Z-Wave®, Bluetooth®, XHTML® Basic, Nokia's XHTML Mobile Profile, and WAP by the Open Mobile Alliance.

The access control information used in the invention includes the following technology such as a pass code, token, biometric identification information, the timeslot, date, and information identifying a property door and an apartment door.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture.

Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

We claim:

1. A property security system for providing access to at least one service provider by at least one user that can reside in a property so that said at least one service provider can provide at least one service and said property has a main door with a main door radio frequency lock and at least one apartment door with an at least one apartment door radio frequency lock, the property security system comprising:

said at least one user can have a user mobile device and said user mobile device in communication with a webserver using a webserver electronic communications device;

said at least one service provider can have at least one service provider mobile device and said at least one service provider mobile device in communication with a webserver using a webserver electronic communications device and said at least one service providers mobile device capable of radio frequency communication with said main door radio frequency lock and said at least one apartment door radio frequency lock;

said webserver using a webserver access control module providing at least one access time slots, at least one service date and access control information for said main door radio frequency lock and access control information for at least one apartment door radio frequency lock;

said property security system in communication with said webserver using said webserver electronic communications device;

said webserver having said plurality of access time slots and said access control information allowing access to said property by said at least one service provider using a service provider mobile application on a at least one service provider mobile device;

a webserver administration module configured for managing said at least one service provider and said property using said property security system;

said at least one user can use said user mobile device to review said at least one service provider qualifications and select said at least one service provider based on qualifications;

said at least one user using said property security system using said webserver access control module provides said at least one service provider mobile device with said at least one access time and said main door radio frequency lock control information and at least one apartment door radio frequency lock access control information; and said at least one service provider using said at least one service provider mobile device downloads said main door radio frequency lock control information to said main door radio frequency lock using radio frequency communication to open said main door and said at least one service provider using said at least one service provider mobile device downloads said at least one apartment door radio frequency lock control information to said an at least one apartment door radio frequency lock using radio frequency communication to open said at least one apartment door.

2. The property security system of claim 1 wherein said webserver further includes:
a work queue management module;
an order management module;
a fulfillment manager;
a service provider module;
a task quota module; and
a scheduling module.

3. The property security system of claim 1 wherein said webserver access control module is in communication with said service provider mobile application on said service provider mobile device using said service provider mobile device communication module, said webserver access control module communicating said at least one access time slot and said at least one service date to said at least one service provider accessing said property security system to open said main door radio frequency lock and at least one apartment door radio frequency lock at said property.

4. The property security system of claim 1, wherein a webserver access control information includes a pass code, a token, at least one biometric identification information, said at least one access time slot, said at least one service date, and said one main door radio frequency lock access control information and said at least one apartment door radio frequency lock access control information.

5. The property security system of claim 1, wherein said webserver communication module includes a webserver communication module application using an electronic communication method protocol to communicate with said service providers mobile application on said service providers mobile device.

6. The property security system of claim 5, wherein said electronic communication method protocol is selected from the group including Wi/FI, Zigbee, Z-Wave, Bluetooth, XHTML Basic, Nokia's XHTML Mobile Profile, and WAP.

7. The property security system of claim 2, wherein said webserver access control module uses the service provider module and said task quota module to select the said at least one service provider and communicate to said service provider mobile device having said service provider mobile application.

8. The property security system of claim 2, wherein said fulfillment manager includes information comprising:
said at least one service provider;
said at least one service;
said at least one service time slot;
said at least one service date;
said access control information; and
a location requiring service, said location requiring service having said main door radio frequency lock capable of receiving said access control information from said property security system and said service providers mobile application on said service providers mobile device, said main door radio frequency lock comparing said main door radio frequency lock access control information received from said property security system to said main door radio frequency lock access control information received from said service providers mobile device, said main door radio frequency lock opening when said main door radio frequency lock access control information received from said service providers mobile device is equal to said main door radio frequency lock access control information received from said property security system.

9. The property security system of claim 1, wherein said access webserver control module allows said at least one user to define said at least one access time slot and said at least one service access date.

10. The property security system of claim 1, wherein said access control system allows access to said at least one service provider only during a specified time slot of said at least one plurality of access time slot slots and at least one service date when said at least one service provider is scheduled to provide at least one service.

11. The property security system of claim 2, wherein said scheduling module communicates with said webservice access control module, said webservice access control module communicates access information for at least one property security system and said at least one service provider mobile application and at least one said main door lock configuration at said property and said at least one apartment door lock.

12. A method for providing a service to at least one customer residing in a property, wherein an access management system communicates:
at least one service providers stored data using an electronic communication device having an electronic communication device application to a property security system using a property electronic communication device;
said at least one service providers stored data on said property security system comprising of service provider's biometric data;
said property comprises of at least one main door having a main door radio frequency lock that can communicate with electronic communication device and at least one apartment door with an apartment door radio frequency lock that can communicate with electronic communication device and the property security system is in communication with at least one main door radio frequency lock that controls at least one main door and at least one apartment door radio frequency lock that controls at least one apartment door using said electronic communication device; and
said main door radio frequency lock reading said service provider's biometric data and comparing it to a service provider's stored biometric data data on said property security system and said main door radio frequency lock providing access to said main door if said service provider's stored biometric data is equal to said main door radio frequency lock reading of said service provider's biometric data, at an access time slot and access date, stored in said access management system.

13. The method of claim 12, wherein said electronic communication device further includes a protocol selected from the group including Wi/FI, Zigbee, Z-Wave, Bluetooth, XHTML Basic, Nokia's XHTML Mobile Profile, and WAP by the Open Mobile Alliance.

14. The method of claim 12 wherein said service provider's biometric data is selected from the group including a fingerprint, an iris scan, a palm scan and a facial recognition.

* * * * *